United States Patent
McIntosh

(10) Patent No.: US 11,694,235 B2
(45) Date of Patent: Jul. 4, 2023

(54) METHOD, APPARATUS, AND COMPUTER READABLE MEDIUM FOR PROVIDING A MODULAR FRAMEWORK OF ASYNCHRONOUS AND PARALLEL PROCESSES

(71) Applicant: Groupon, Inc., Chicago, IL (US)

(72) Inventor: Sean McIntosh, Seattle, WA (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 17/443,284

(22) Filed: Jul. 23, 2021

(65) Prior Publication Data

US 2021/0350420 A1 Nov. 11, 2021

Related U.S. Application Data

(63) Continuation of application No. 14/200,699, filed on Mar. 7, 2014.

(51) Int. Cl.
 *G06Q 30/0241* (2023.01)
(52) U.S. Cl.
 CPC ............... *G06Q 30/0276* (2013.01)
(58) Field of Classification Search
 CPC .................................................. G06Q 30/0276
 See application file for complete search history.

(56) References Cited

U.S. PATENT DOCUMENTS

| | | |
|---|---|---|
| 5,710,887 A | 1/1998 | Chelliah et al. |
| 5,816,918 A | 10/1998 | Kelly et al. |
| 5,890,175 A | 3/1999 | Wong et al. |
| 5,905,895 A | 5/1999 | Halter |
| 6,035,280 A | 3/2000 | Christensen |
| 6,061,660 A | 5/2000 | Eggleston et al. |
| 2009/0024477 A1 | 1/2009 | Kramer et al. |

(Continued)

OTHER PUBLICATIONS

U.S. Appl. No. 14/200,699, filed Mar. 7, 2014, Not published, Pending.

(Continued)

*Primary Examiner* — Alexandru Cirnu
(74) *Attorney, Agent, or Firm* — Alston & Bird LLP

(57) ABSTRACT

Provided herein are systems, methods, and computer readable media for programmatically generating and/or revising promotion offers for a merchant based on one or more merchant self-service indicators. In providing such functionality, the system can be configured to, for example, receive one or more merchant self-service indicators; store the self-service indicators; generate a promotion based on a plurality of promotion components, wherein the generation of the promotion components comprises accessing the promotion component generators by enabling asynchronous processing of the promotion component generation requests, wherein the accessing of the promotion component generators occurs in parallel which enables parallel generation of each of the promotion components via independent performance of the promotion component generators; comparing the self-service indicators that were previously stored against required and optional inputs of the promotion component generators; selecting the promotion component generators based on required and optional inputs; and generating the promotion from the promotion components generated.

20 Claims, 6 Drawing Sheets

(56) References Cited

U.S. PATENT DOCUMENTS

| | | |
|---|---|---|
| 2013/0042195 A1 | 2/2013 | Svoyatsky et al. |
| 2013/0231999 A1 | 9/2013 | Emrich et al. |
| 2014/0040007 A1* | 2/2014 | Relyea, Jr. ......... G06Q 30/0242 705/14.57 |
| 2014/0122200 A1* | 5/2014 | Granville ........... G06Q 30/0276 705/14.72 |
| 2014/0207571 A1 | 7/2014 | Hammock et al. |

OTHER PUBLICATIONS

Amended Complaint, United States District Court for the District of Delaware, *Kray IP Holdings, LLC* v. *Groupon Inc.* 1-17-cv-01405 (DDE), Feb. 6, 2019. 24 pages.
Amended Complaint, United States District Court for the District of Delaware, *Kroy IP Holdings, LLC* v. *Groupon Inc.* 1-17-CV-01405 (DDE), Jan. 22, 2019. 24 pages.
Complaint for Patent Infringement, United States District Court for the District of Delaware, *Kroy IP Holdings, LLC* v. *Groupon Inc.* 1-17-CV-01405 (DDE), Oct. 6, 2017. 19 pages.
Corrected Petition for Inter Partes Review, *Groupon, Inc.* v. *Kroy IP Holdings, LLC* IPR2019-00044 (PTAB), Oct. 10, 2018. 82 pages.
Decision instituting Inter Partes Review, *Groupon, Inc.* v. *Kroy IP Holdings, LLC* PTAB-IPR2019-00061, Apr. 19, 2019. 39 pages.
Decision instituting Inter Partes Review, *Groupon, Inc.* v. *Kroy IP Holdings, LLC*, IPR2019-00044 (PTAB), Apr. 19, 2019. 43 pages.
Exhibit 1002 of Petition for Inter Partes Review, declaration of Dan Harkey, *Groupon, Inc.* v. *Kroy IP Holdings, LLC* IPR2019-00040 (PTAB), Oct. 10, 2018. 196 pages.
Exhibit 1002 to Petition for Inter Partes Review, Declaration of Dan Harkey, *Groupon, Inc.* v. *Kroy IP Holdings, LLC* IPR2019-00040 (PTAB), Oct. 10, 2018. 196 pages.
Exhibit 1007 to Petition for Inter Partes Review, Stanek, Microsoft Frontpage Unleashed—Part 1, *Groupon, Inc.* v. *Kroy IP Holdings, LLC* IPR2019-00040 (PTAB), Oct. 10, 2018. 150 pages.
Exhibit 1007 to Petition for Inter Partes Review, Stanek, Microsoft Frontpage Unleashed—Part 2, *Groupon, Inc.* v. *Kroy IP Holdings, LLC* IPR2019-00040 (PTAB), Oct. 10, 2018. 147 pages.
Exhibit 1014 to Deposition transcript of the deposition of Daniel H. Harkey on Jun. 25, 2019, *Groupon, Inc.* v. *Kroy IP Holdings, LLC*, IPR2019-00044 (PTAB), Aug. 2, 2019. 52 pages.
Exhibit 1015 to Supplemental Declaration of Dan Harkey, *Groupon, Inc.* v. *Kroy IP Holdings, LLC*, IPR2019-00044 (PTAB), Oct. 11, 2019. 41 pages.
Exhibit 1016 of Petitioner's Reply, Microsoft Press Computer Dictionary, *Groupon, Inc.* v. *Kroy IP Holdings, LLC*, IPR2019-00044 (PTAB), Oct. 11, 2019. 4 pages.
Exhibit 1017 of Petitioner's Reply, Deposition Transcript of D. Schmidt, *Groupon, Inc.* v. *Kroy IP Holdings, LLC*, IPR2019-00044 (PTAB), Oct. 11, 2019. 397 pages.
Exhibit 2001 to Patent Owners Preliminary Response, Declaration Of Douglas Schmidt, Ph.D, *Groupon, Inc.* v. *Kroy IP Holdings, LLC*, IPR2019-00044 (PTAB), Jan. 22, 2019. 94 pages.
Exhibit 2003 to Patent Owners Preliminary Response, U.S. Appl. No. 60/063,180, *Groupon, Inc.* v. *Kroy IP Holdings, LLC* IPR2019-00044 (PTAB), Jan. 22, 2019. 103 pages.
Exhibit 2004 to Patent Owners Preliminary Response, U.S. Appl. No. 60/067,776, *Groupon, Inc.* v. *Kroy IP Holdings, LLC* IPR2019-00044 (PTAB), Jan. 22, 2019. 18 pages.
Exhibit 2005 to Patent Owners Preliminary Response, The Common Object Request Broker: Architecture and Specification, *Groupon, Inc.* v. *Kroy IP Holdings, LLC*, IPR2019-00044 (PTAB), Jan. 22, 2019. 41 pages.
Exhibit 2006 to Patent Owner's Response, a Supplemental Declaration of Douglas C. Schmidt, PH.D., *Groupon, Inc.* v. *Kroy IP Holdings, LLC*, IPR2019-00044 (PTAB), Jul. 17, 2019. 19 pages.

Hearing Transcript, *Groupon, Inc.* v. *Kroy IP Holdings, LLC*, IPR2019-00044 (PTAB), Jan. 23, 2020. 102 pages.
Judgment and Final Written Decision, *Groupon, Inc.* v. *Kroy IP Holdings, LLC* PTAB-IPR2019-00061 (PTAB), Apr. 16, 2020. 63 pages.
Judgment and Final Written Decision, *Groupon, Inc.* v. *Kroy IP Holdings, LLC*, IPR2019-00044 (PTAB), Apr. 16, 2020. 69 pages.
Patent Owner's Preliminary Response, *Groupon Inc.* v. *Kroy IP Holdings, LLC* IPR2019-00044 (PTAB), Jan. 22, 2019. 73 pages.
Patent Owner's Response, a Supplemental Declaration of Douglas C. Schmidt, PH.D., *Groupon, Inc.* v. *Kroy IP Holdings, LLC* PTAB-IPR2019-00061 (PTAB), Jul. 17, 2019. 19 pages.
Patent Owner's Response, *Groupon, Inc.* v. *Kroy IP Holdings, LLC* PTAB-IPR2019-00061 (PTAB), Jul. 17, 2019. 68 pages.
Patent Owner's Response, *Groupon, Inc.* v. *Kroy IP Holdings, LLC*, IPR2019-00044 (PTAB), Jul. 17, 2019. 71 pages.
Patent Owner's Sur-Reply, *Groupon, Inc.* v. *Kroy IP Holdings, LLC* PTAB-IPR2019-00061 (PTAB), Nov. 19, 2019. 14 pages.
Patent Owner's Sur-Reply, *Groupon, Inc.* v. *Kroy IP Holdings, LLC*, IPR2019-00044 (PTAB), Nov. 19, 2019. 10 pages.
Patent Owners Demonstratives, *Groupon, Inc.* v. *Kroy IP Holdings, LLC*, IPR2019-00044 (PTAB), Jan. 17, 2020. 106 pages.
Patent Owners Preliminary Response, *Groupon, Inc.* v. *Kroy IP Holdings, LLC* PTAB-IPR2019-00061, Jan. 22, 2019. 72 pages.
Petition for Inter Partes Review, *Groupon, Inc.* v. *Kroy IP Holdings, LLC* IPR2019-00040 (PTAB), Oct. 10, 2018. 69 pages.
Petition for Inter Partes Review, *Groupon, Inc.* v. *Kroy IP Holdings, LLC* IPR2019-00044 (PTAB), Oct. 10, 2018. 82 pages.
Petition for Inter Partes Review, *Groupon, Inc.* v. *Kroy IP Holdings, LLC* PTAB-IPR2019-00061, filed on Oct. 10, 2018. 69 pages.
Petitioner's Demonstrative Exhibits, *Groupon, Inc.* v. *Kroy IP Holdings, LLC*, IPR2019-00044 (PTAB), Jan. 17, 2020. 96 pages.
Petitioner's Updated Exhibit List, *Groupon, Inc.* v. *Kroy IP Holdings, LLC* PTAB-IPR2019-00061 (PTAB), Aug. 2, 2019. 4 pages.
Petitioner's Updated Exhibit List, *Groupon, Inc.* v. *Kroy IP Holdings, LLC*, IPR2019-00044 (PTAB), Aug. 2, 2019. 4 pages.
Petitioner's Reply, *Groupon, Inc.* v. *Kroy IP Holdings, LLC* PTAB-IPR2019-00061 (PTAB), Oct. 11, 2019. 35 pages.
Petitioner's Reply, *Groupon, Inc.* v. *Kroy IP Holdings, LLC*, IPR2019-00044 (PTAB), Oct. 11, 2019. 34 pages.
U.S. Application entitled "Automated Deal Guide Optimization", filed Sep. 26, 2013; first named inventor: Nkengla, U.S. Appl. No. 14/038,610.
U.S. Application entitled "Dual Generation Using Point-of-Sale Systems and Related Methods", filed Mar. 15, 2013; first named inventor: Scholl, U.S. Appl. No. 13/839,226.
U.S. Application entitled "Fine Print Builder", filed Jun. 27, 2013; first named inventor: Koren, U.S. Appl. No. 13/929,253.
U.S. Application entitled "Generating Promotion Offers and Providing Analytics Data", filed Mar. 15, 2013; first named inventor: Kim, U.S. Appl. No. 13/833,548.
U.S. Application entitled "Method and Apparatus for Determining Promotion Pricing Parameters", filed Jun. 10, 2013; first named inventor: Gene-Kaya, U.S. Appl. No. 13/913,887.
U.S. Application entitled "Method and Apparatus for Promotion Template Generation", filed Jun. 20, 2013; first named inventor: Eyal, U.S. Appl. No. 13/922,750.
U.S. Application entitled "Method, Apparatus, and Computer Readable Medium for Providing a Self-Service Interface", filed Jan. 24, 2013; first named inventor: Wicha, U.S. Appl. No. 13/749,272.
U.S. Application entitled "Online Ordering for In-Shop Service", filed Mar. 15, 2013; first named inventor: Scholl, U.S. Appl. No. 13/839,414.
U.S. Provisional Application entitled "Generating Deal Offers and Providin Analytics Data", filed Mar. 30, 2012; first named inventor: Kim, U.S. Appl. No. 61/618,338.

\* cited by examiner

METHOD, APPARATUS, AND COMPUTER READABLE MEDIUM FOR PROVIDING A MODULAR FRAMEWORK OF ASYNCHRONOUS AND PARALLEL PROCESSES

FIELD

Embodiments of the invention relate, generally, to providing an interface to a commerce system and, more particularly, to a method, apparatus, and computer readable medium for providing a modular framework of asynchronous and parallel processes.

BACKGROUND

Applicant has discovered problems with current methods for providing a self-service interface for generation of promotions. Through applied effort, ingenuity, and innovation, Applicant has solved many of these identified problems by developing a solution that is embodied by the present invention, which is described in detail below.

BRIEF SUMMARY

In general, embodiments of the present invention provide herein systems, methods and computer readable media for programmatically registering and verifying a merchant, and allowing the merchant to generate and/or revise promotion offers. In providing such functionality, the system can be configured to, for example, monitor and analyze various promotion offers, including current promotion offers and analytics data about promotion-related purchases, that enable the system to determine the relative successfulness of a promotion offer for a merchant and/or category of merchant. These promotion offers may be indexed with a set of merchant self-service indicators, such that when a new merchant registers with the system, the system determines the merchant self-service indicators for the newly added merchant and suggests promotions associated with those merchant self-service indicators. Upon determining what has been more successful or is expected to be a more successful promotion offer for the merchant based on the merchant self-service indicators, the system can present the generated promotion offer to the newly registered merchant for approval and/or make the promotion offer to consumers programmatically by a promotion and marketing service located remotely from the merchant device and the consumer device. In some embodiments, the remotely located promotion and marketing service may be further configured to revise the promotion offer programmatically and/or upon receiving the merchant's approval of the proposed edits to the promotion offer.

Embodiments may include methods, apparatuses, and computer program products for providing a merchant self-service interface in a modular manner. Embodiments of an example method may include determining, using a processor executing a self-service management application, a promotion context. The promotion context may include one or more merchant self-service indicators. The method may also include determining one or more inputs for a first promotion component generator based on a schema associated with the first promotion component generator for use in a promotion generation operation to generate a promotion. The first promotion component generator may include a process executing asynchronously from the self-service management application, wherein the generation of the promotion components comprise accessing, by the self-service management application, the plurality of promotion component generators and wherein the individual accessing of the promotion component generators enables asynchronous processing of the promotion component generation requests from the self-service management application. The method may also include providing the one or more inputs to the first promotion component generator to generate at least one component of the promotion and receiving the at least one component from the first promotion component generator. The method may also include the individual accessing of the promotion component generators to occur in parallel, enabling parallel generation of each of the plurality of promotion components via independent performance of the plurality of promotion component generators. The method may also include providing the at least one component for confirmation, such that a promotion is generated in response to receiving confirmation of the at least one component.

In some embodiments, the method may include generating the promotion using the at least one component. The first promotion component generator may be at least one of a fine print builder module, a promotion price parameter module, a promotion text generation module, or a promotion editorial content module. The method may also include determining whether all of the inputs for the first promotion component generator are available to be provided to the first promotion component generator. The method may further include, in response to determining that all of the inputs for the first promotion component generator are not present, providing an interface for entry of the inputs that are not present. The method may also include providing the inputs to the first promotion component generator only in response to determining that all of the inputs for the first promotion component generator are present. In some embodiments, the method further includes determining that at least one input is missing for at least one second promotion component generator, in response to determining that the at least one input is missing, excluding the at least one second promotion component generator for use in the promotion generation operation. The promotion component may be provided in a markup language format. The method may also include generating a dependency graph for a plurality of promotion component generators. The plurality of promotion component generators may include the first promotion component generator.

Embodiments of the method may also include executing each of the promotion component generators in response to determining that the dependencies for each respective promotion component generator are satisfied. The method may further include prompting a user for the one or more inputs for the first promotion component generator in response to receiving a selection of the first promotion component generator.

In some embodiments, the method may further comprise, upon selection of a particular promotion component generator, initiating a set of tasks or processes necessary for generating the first promotion component, wherein the set of tasks is dependent on the inputs, wherein one or more portions of the set of tasks for generating the first promotion component are implemented as disjoint steps that are performed in parallel with the overall promotion generation process, wherein steps of the one or more portions of the set of tasks are not able to be performed at the time the selection is made, and instead are processed as one or more prerequisites are satisfied.

Yet further embodiments may include an apparatus for providing a merchant self-service interface. Embodiments of the apparatus may include at least one processor coupled to a memory, the memory comprising computer executable instructions that, when executed by the processor, configure the apparatus. The apparatus may be configured by the instructions to determine a promotion context. The promotion context may include one or more merchant self-service indicators. The apparatus may also determine one or more inputs for a first promotion component generator based on a schema associated with the first promotion component generator for use in a promotion generation operation to generate a promotion. The first promotion component generator may include a process executing asynchronously from the self-service management application, wherein the generating the plurality of the promotion components, including the first promotion component and second promotion component, comprises computer executable instructions to access, based on the self-service indicators, individually, each of the plurality of promotion component generators, wherein the individual accessing of each of the promotion component generators enables asynchronous processing of the promotion component generation requests from the self-service management application. The apparatus may be further configured to provide the one or more inputs to the first promotion component generator to generate at least one component of the promotion, and to receive the at least one component from the first promotion component generator. The apparatus may also include the individual accessing of the promotion component generators to occur in parallel, enabling parallel generation of each of the plurality of promotion components via independent performance of the plurality of promotion component generators.

In some embodiments, the apparatus may be further configured to provide the at least one component for confirmation, such that a promotion is generated in response to receiving confirmation of the at least one component. The apparatus may also be further configured to generate the promotion using the at least one component. The first promotion component generator may be at least one of a fine print builder module, a promotion price parameter module, a promotion text generation module, or a promotion editorial content module. The apparatus may be further configured to determine whether all of the inputs for the first promotion component generator are available to be provided to the first promotion component generator. In response to determining that all of the inputs for the first promotion component generator are not present, the apparatus may provide an interface for entry of the inputs that are not present. The apparatus may also be configured to provide the inputs to the first promotion component generator only in response to determining that all of the inputs for the first promotion component generator are present.

In some embodiments, the apparatus may be further configured to determine that at least one input is missing for at least one second promotion component generator, and, in response to determining that the at least one input is missing, exclude the at least one second promotion component generator for use in the promotion generation operation. In some embodiments, the first promotion component generator may depend on output from at least one additional promotion component generator, and the first promotion component generator may delay processing until processing of the at least one additional promotion component generator is complete. The promotion component may be provided in a markup language format.

In yet further embodiments, the apparatus is further configured to generate a dependency graph for a plurality of promotion component generators. The plurality of promotion component generators may include the first promotion component generator. The apparatus may be configured to execute each of the promotion component generators in response to determining that the dependencies for each respective promotion component generator are satisfied. In some embodiments, the apparatus is further configured to prompt a user for the one or more inputs for the first promotion component generator in response to receiving a selection of the first promotion component generator.

In yet further embodiments, the apparatus is further configured to, upon selection of a particular promotion component generator, initiate a set of tasks or processes necessary for generating the first promotion component, wherein the set of tasks is dependent on the inputs, wherein one or more portions of the set of tasks for generating the first promotion component are implemented as disjoint steps that are performed in parallel with the overall promotion generation process, wherein steps of the one or more portions of the set of tasks are not able to be performed at the time the selection is made, and instead are processed as one or more prerequisites are satisfied.

Some embodiments may provide a non-transitory computer readable storage medium comprising instructions that, when executed by a processor, configure the processor. The instructions may configure the processor to determine a promotion context. The promotion context may include one or more merchant self-service indicators. The instructions may further configure the processor to determine one or more inputs for a first promotion component generator based on a schema associated with the first promotion component generator for use in a promotion generation operation to generate a promotion. The first promotion component generator may include a process executing asynchronously from the self-service management application, wherein generating the plurality of the promotion components, including the first promotion component and second promotion component, a processor is configured to access, by the self-service management application, based on the self-service indicators, individually, each of the plurality of promotion component generators, wherein the individual accessing of each of the promotion component generators enables asynchronous processing of the promotion component generation requests from the self-service management application. The instructions may also configure the processor to provide the one or more inputs to the first promotion component generator to generate at least one component of the promotion, and to receive the at least one component from the first promotion component generator. The instructions may also configure the processor to individually access the plurality of promotion component generators to occur in parallel, enabling parallel generation of each of the plurality of promotion components via independent performance of the plurality of promotion component generators.

In further embodiments, the instructions may further configure the processor to provide the at least one component for confirmation, such that a promotion is generated in response to receiving confirmation of the at least one component. In some embodiments the instructions further configure the processor to generate the promotion using the at least one component. The first promotion component generator may be at least one of a fine print builder module, a promotion price parameter module, a promotion text generation module, or a promotion editorial content module. The instructions may further configure the processor to determine whether all of the inputs for the first promotion component generator are available to be provided to the first promotion component generator. In some embodiments, the instructions further configure the processor to, in response to determining that all of the inputs for the first promotion component generator are not present, provide an interface for entry of the inputs that are not present. In yet further embodiments, the instructions further configure the processor to provide the inputs to the first promotion component generator only in response to determining that all of the inputs for the first promotion component generator are present. The instructions may also further configure the processor to determine that at least one input is missing for at least one second promotion component generator, and, in response to determining that the at least one input is missing, exclude the at least one second promotion component generator for use in the promotion generation operation.

In some embodiments, the instructions further configure the processor to, upon selection of a particular promotion component generator, initiate a set of tasks or processes necessary for generating the first promotion component, wherein the set of tasks is dependent on the inputs, wherein one or more portions of the set of tasks for generating the first promotion component are implemented as disjoint steps that are performed in parallel with the overall promotion generation process, wherein steps of the one or more portions of the set of tasks are not able to be performed at the time the selection is made, and instead are processed as one or more prerequisites are satisfied. The promotion component may be provided in a markup language format. In yet further embodiments, the instructions may further configure the processor to generate a dependency graph for a plurality of promotion component generators, the plurality of promotion component generators comprising the first promotion component generator. The instructions may also configure the processor to execute each of the promotion component generators in response to determining that the dependencies for each respective promotion component generator are satisfied. The instructions may further configure the processor to prompt a user for the one or more inputs for the first promotion component generator in response to receiving a selection of the first promotion component generator.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Introduction and Definitions

Figure 1:
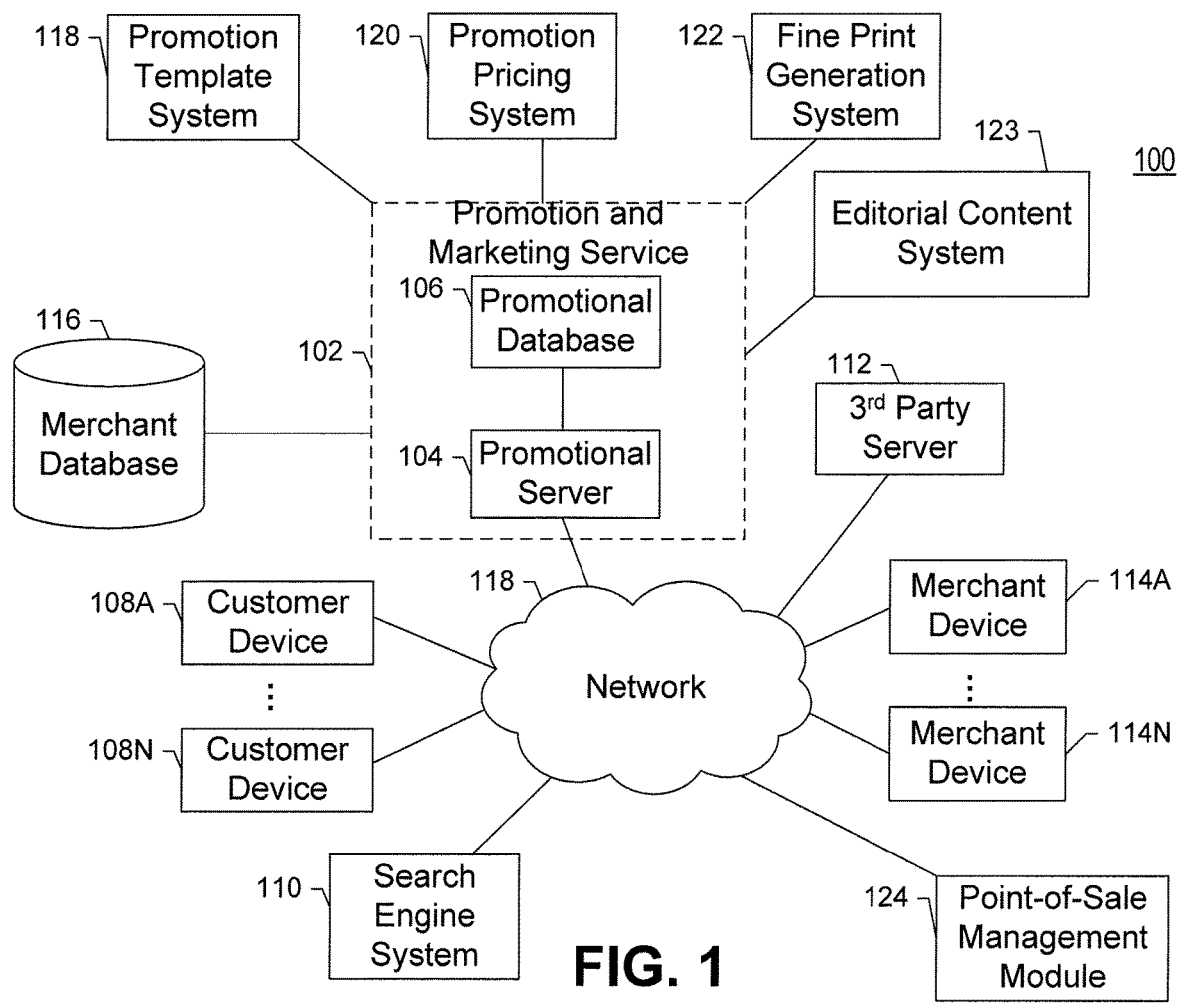
FIG. 1 depicts an example system in accordance with some embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "promotion component" is used to refer to elements of a particular promotion that may be selected during a promotion generation process. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, or the like. Promotion components may also include various registration and verification functions, such as verifying the identity of the merchant, registering the merchant with the promotion and marketing service, or the like. In such a scenario, the "promotion component" may include a registered user account or a verified merchant identity.

In the context of the present application, the terms "merchant self-service indicator" and "promotion context" relate to data associated with the merchant that may be used by promotion component generators to suggest promotion components to the merchant. A promotion context may include a plurality of merchant self-service indicators. For example, a promotion context may include multiple merchant self-service indicators that describe various features or characteristics of the merchant, such as a the type of industry of the merchant, the type of products or services sold by the merchant, the size of the merchant, the location of the merchant, the sales volume of the merchant, reviews and ratings for the merchant, or the like.

In some embodiments, the merchant self-service indicators are a result of analytics that allow for generation of deals that are ideal for the particular merchant's circumstances. For example, the merchant self-service indicators may be used to identify optimal deals for the particular merchant based on their exact location (e.g. the particular city street of the merchant as opposed to a wider range, such as a zip code), the merchant's exact products and services offered (e.g., pizzerias that only serve deep dish pizza, restaurants that become nightclubs after 11:00 pm), the merchant's price point (e.g., barbershops that charge more than $20 for a haircut), or the date or season of the year (e.g., offering ski equipment during the winter, or holiday themed promotions during the holiday season), or the like. These merchant self-service indicators may be used in a self-service process to identify deal parameters that were used by other merchants that share one or more same or similar merchant self-service indicators. For example, after initial registration and verification, the promotion and marketing system may identify the merchant self-service indicators associated with the newly registered merchant, such as by looking up the merchant in a merchant database or by receiving the merchant self-service indicators directly from the merchant (e.g., by a fillable form). The identified merchant self-service indicators may be cross-referenced with deal offers from other merchants to identify deal offers that were successful for other merchants with the same or similar merchant self-service indicators.

The term "promotion content" may be understood to refer to cosmetic display factors that influence how the promotion is displayed to consumers. For example, promotion content may include an image associated with the promotion, a narrative description of the promotion or the merchant, a display template for association with the promotion, or the like. For example, the merchant self-service indicators may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

Overview

Merchants sell goods and services (collectively referred to herein as "products") to consumers. The merchants can often control the form of their product offers, the timing of their product offers, and the price at which the products will be offered. The merchant may sell products at a brick-and-mortar sales location, a virtual online site, or both.

Discounts have been used as part of some retail strategies. Discount techniques include providing coupons and rebates to potential consumers, but these techniques have several disadvantages. In this regard, a number of deficiencies and problems associated with the systems used to, among other things, provide discounts to consumers have been identified. Initial registration and setup to allow a merchant to provide promotions using a promotion system is typically a lengthy and involved process. This process may include separate steps by representatives of a promotion and marketing service to verify that a user who wishes to create a promotion is an authorized representative of the merchant, and that promotion offers prepared by the merchant are valid and likely to be of interest to consumers. The hands-on nature of the promotion generation process means that the process is not scalable as the number of merchants accessing the system increases, since each merchant must interact with a staff member of the promotion and marketing service for verification, promotion generation, and various other steps in the process. As more and more merchants join the system, more and more staff members are required to meet the needs of these merchants in a reasonable time frame.

The inventors have identified various problems and difficulties that occur in providing merchants with the opportunity to create and sell promotions. In particular, the process of generating a new promotion requires direct manual intervention at several stages to avoid breaches of security, to ensure a minimum quality level of promotions provided by the system, and to provide promotions that are of interest to consumers. For example, the promotion and marketing service may wish to ensure that the discount level offered to consumers is sufficient, a minimum profitability threshold is met for the promotion and marketing service, the merchant receives a positive return on investment by offering the promotion, the content of the promotion is appropriate, or the like. As a result of these problems and others that may arise from time to time, delays and inefficiencies may be introduced into the process of generating a new promotion. Furthermore, increased levels of manual oversight increase the man-hours needed to service the needs of merchants in a timely manner, resulting in increased overhead costs which may be passed on the merchant or consumers.

Since the creation and sale of promotions is a relatively new marketplace, the methods and processes for creating new promotions are constantly advancing. New developments in the promotion generation process present unique challenges for the automatic generation of promotions, as an automated system may require constant revision to hit a "moving target" representing the latest state of the art of promotion technology. Different merchant types and promotion categories may utilize different techniques for promotion generation, such that a single automated system may not provide a "one size fits all" solution for self-service promotion generation.

Accordingly, to overcome these problems, example embodiments of the present invention are shown in order to provide a modular self-service process for generating promotions and managing merchant interactions with a promotion and marketing service. Such self-service capabilities may provide for the partial or piece-meal generation of promotions by including separate modules, processes, and/or functionality for generating components of a promotion. A self-service module may provide a promotion context to particular promotion component generator modules to provide each promotion component generator module with information about the promotion for generation of a component of a promotion from the promotion context. In some embodiments, the self-service module may select particular promotion component generator modules based on the promotion context to ensure that any selected promotion component generator modules are provided with information required by the promotion component generator modules to generate their respective promotion components. The use of a modular process as described herein may be compatible with both manual and automated processes, allowing the promotion and marketing service to incrementally and/or partially automate elements of the promotion generation process without disrupting manual implementations. For example, if a manual workflow involves sequential tasks A→B→C, embodiments may provide for a mechanism to automate action "B" without disrupting "A" or "C".

The promotion and marketing service may further provide a self-service interface that offers merchants the ability to register with the promotion and marketing service, to verify their identity, to select various parameters and implementation details for a particular promotion, to submit the promotion parameters for approval, to receive approval of the parameters of the generated promotion, and to publish the generated promotion to consumers for purchase via the promotion and marketing service.

The promotion and marketing service may provide these self-service capabilities to provide merchants with various levels of control over the promotion generation process. For example, embodiments may provide various self-service interactions, including but not limited to automatic verification of a merchant identity, detection and determination of various promotion characteristics based on the merchant identity, determination and suggestion of default promotion parameters for selection by the merchant, determination and suggestion of terms and conditions to the merchant, analysis of promotion statistics to suggest promotion pricing terms, verification of promotion parameters prior to publication, and the like. These self-service interactions may be facilitated by a self-service manager and performed by various promotion component generator modules.

Successful promotions for merchants with similar merchant self-service indicators may be used to generate a suggested promotion for the newly registered merchant, and the newly registered merchant may confirm the suggested promotion to offer the promotion to consumers via the promotion and marketing service. The promotion and marketing service may also provide an interface allowing the merchant to edit or otherwise modify the suggested promotion before confirmation.

Different merchants may receive different pricing from the promotion system based on different factors. For example, merchants that have higher sales volume (and thus are more likely to sell promotion offers), or that are perceived as higher quality (and thus are more desirable) may be offered preferable pricing over smaller or lower quality merchants. In this regard, the promotion and marketing service may adjust the pricing of promotion offers based on the merchant self-service characteristics to adjust pricing for the particular merchant. For example, the price of promotion offers offered to the merchant may be adjusted so that the merchant is guaranteed a positive return on their investment, promotion offer prices may be adjusted based on the size or volume of the merchant, or any other adjustment may be made to the promotion offer parameters as appropriate for the merchant self-service indicators of the particular merchant. Additionally or alternatively, promotion content, such as promotion narratives, images, or other cosmetic features that are presented to a user in connection with the promotion offer, may also be generated using the merchant self-service indicators.

System Architecture and Example Apparatus

The method, apparatus, and computer program product of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, an example embodiment may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Sales representatives and merchants may access a promotion and marketing service 102 via a network 118 (e.g., the Internet, or the like) using computer devices 108A through 108N and 114A through 114N, respectively (e.g., one or more customer devices 108A-108N or one or more merchant devices 114A-114N). Moreover, the promotion and marketing service 102 may comprise a promotional server 104 in communication with a promotional database 106. The promotion and marketing service 102 may further have access to a merchant database 116 storing information about a plurality of merchants, such as may include but is not necessarily limited to merchants operating the one or more merchant devices 114A-114N. In some embodiments, the promotion and marketing service 102 may also communicate with a search engine 110 to list and/or index promotions offered by the promotion and marketing service 102. The promotion and marketing service 102 may be operable to facilitate self-service operations to allow a merchant to generate a promotion to be offered to consumers via the promotion and marketing service 102.

In order to facilitate these self-service operations, the promotion and marketing service 102 may access, interface with, or communicate with a variety of promotion component generators. Examples of these promotion content generators may include, but are not limited to, a promotion template system 118, a promotion pricing system 118, a fine print generation system 122, an editorial content system 123, and/or a point-of-sale management module 124. It should be readily appreciated that also the promotion template system 118, a promotion pricing system 118, a fine print generation system 122, an editorial content system 123, and/or a point-of-sale management module 124 are depicted as separate elements in communication with the promotion and marketing service 102, these systems and modules may also be present within the promotion and marketing service 102. For example, these systems and modules may be implemented as one or more applications or circuitry executing within or upon the promotional server 104.

The promotion template system 118 may function to identify, generate, suggest, and/or provide access to one or more promotion templates. These promotion templates may define a particular promotion structure to be used for a particular promotion based on various factors, including but not limited to the particular merchant, the type of product or service being sold, the merchant's location, the date, the season, or the like. The promotion templates may define a grammar that allows for insertion of data relevant to the particular promotion (e.g., the merchant's address or contact information). In some embodiments, the promotion templates may be identified using past promotion performance data to select an "optimal" promotion template for a particular merchant, good or service, or the like. For example, the promotion template system 118 may collect analytics on the use of particular terms and template structures to generate templates that are more likely to be of interest to consumers. Example operations of a promotion template system 118 are described further in U.S. patent application Ser. No. 13/922,750, filed Jun. 20, 2013, which is herein incorporated by reference in its entirety.

The promotion pricing system 120 may be employed to determine and suggest various price terms to be associated with a newly generated promotion. For example, the promotion pricing system 120 may identify an optimal discount level off a retail price that will result in the sale of a particular number of promotions. The promotion pricing system 120 may further identify a price term to be used by a promotion and marketing service to be charged to the merchant for the use of the promotion and marketing service. Determination of these price terms may be performed by the promotion pricing system 120 through analysis of various factors, including but not limited to economic indicators associated with the location of the merchant, past performance of promotions for the same or a similar location, type of product or service, or merchant, or the volume of business the merchant has done with the promotion and marketing service. Example operations of a promotion pricing system 120 are described further in U.S. patent application Ser. No. 13/913,887, filed Jun. 10, 2013, which is herein incorporated by reference in its entirety.

The fine print generation system 122 may be employed to determine and suggest terms and conditions for a newly generated promotion. These terms and conditions may relate to so-called "fine print" of the promotion, which may include, but is not limited to, a quantity of promotions, a redemption deadline, a promotion limit per customer, a promotion limit per visit, instructions for redemption, locations for redemption, and the like. In some embodiments, the fine print generation system 122 may present the merchant with a set of possible selections for terms and conditions. These selections may be presented in the form of a "Wizard" or "Expert System" which prompts the merchant with a series of questions to assist with selection of terms and conditions for the newly generated promotion. Example operations of a fine print generation system 122 are described further in U.S. patent application Ser. No. 13/929,253, filed Jun. 27, 2013, which is herein incorporated by reference in its entirety.

The editorial content system 123 may be employed to generate and/or modify promotion content for a promotion. For example, the editorial content system 123 may generate or select default content (e.g., a default title, promotion description, or an image to be associated with the promotion) for the promotion. In some embodiments, the default content may be augmented or modified with custom content generated for the merchant by the editorial content system. In some embodiments, the promotion content may be generated by asking the merchant one or more questions (e.g., a "Wizard" content generation system), and customizing the content based on the answers to the questions provided by the merchant.

The point-of-sale management module 124 may function to enable a merchant to interface with a merchant point-of-sale or inventory system to facilitate generation of promotions. For example, the point-of-sale management module 124 may determine which products or services are being sold by the merchant to identify appropriate products and services for newly generated promotions (e.g., suggesting promotions directed to products or services of which the merchant has excess inventory, or suggesting promotions directed to products in which the merchant appears to specialize). In some embodiments, the point-of-sale management module 124 may also interface with a merchant online storefront to perform similar functions. The point-of-sale management module 124 may also be configured to provide transaction data to the promotion and marketing service for determining the type and value of goods sold. Example operations of a point-of-sale management module 124 are described further in U.S. patent application Ser. No. 13/839,226, filed Mar. 15, 2013, and U.S. patent application Ser. No. 13/839,414, filed Mar. 15, 2013, which are hereby incorporated by reference in their entirety.

Figure 2:
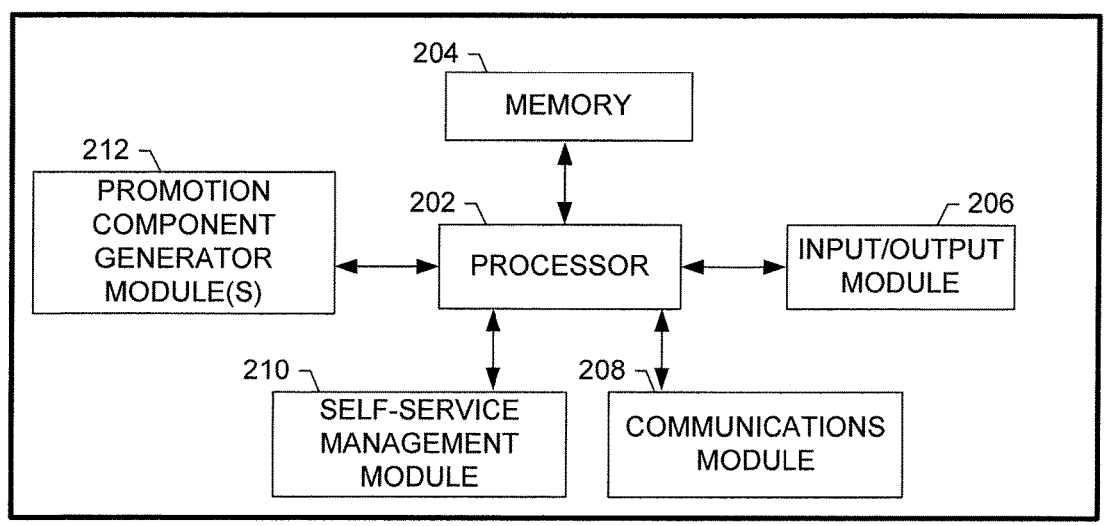
FIG. 2 depicts a schematic block diagram of circuitry that can be included in a computing device, such as a merchant machine, consumer machine and/or promotion and marketing system, in accordance with some embodiments described herein.

The promotional server 104 may be embodied by a computing system, such as apparatus 200 shown in FIG. 2. As illustrated in FIG. 2, the apparatus 200 may include a processor 202, a memory 204, an input/output module 206, a communications module 208, a self-service management module 210, and one or more promotion component generators 212. The apparatus 200 may be configured to execute the operations described below. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display and may comprise a web user interface, a mobile application, a client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The self-service management module 210 may be operable to facilitate interactions between a merchant and the promotion and marketing service 102 to enable the merchant to generate and manage promotions offered by the promotion and marketing service. The self-service management module 210 may manage the process by providing a promotion context to one or more of the promotion component generators 212 to generate components of a promotion. The self-service management module 210 may select particular promotion component generators for participation in the promotion generation process. For example, the self-service management module 210 may select a particular promotion component generator based on the type of merchant, a time of year, a merchant location, or the like. Promotion component generators may also be selected based on the presence or absence of particular information within the promotion context. For example, if a given promotion component generator requires the merchant to provide point-of-sale information, but the merchant has not provided access to their point-of-sale information, then the self-service management module 210 may not select that particular content generator. The self-service management module 210 may further facilitate generation of promotion components in an asynchronous fashion, where promotion component generators are provided with the promotion context and executed in parallel with one another according to dependencies managed by the self-service management module 210.

The self-service management module 210 may provide a user interface by which the merchant may provide a set of parameters via a web page interface or a server interface for a client application executing on a merchant device. These parameters may be used to generate a promotion context which is used by the promotion component generators 212 to define components of a new promotion to be offered by the promotion and marketing service.

Example operations of the self-service module 210 and merchant self-service systems are further described in U.S. Provisional Patent Application 61/618,338, filed Mar. 30, 2012, U.S. patent application Ser. No. 13/833,548, filed Mar. 15, 2013, and U.S. patent application Ser. No. 13/749,272, filed Jan. 24, 2013, and U.S. patent application Ser. No. 14/038,610, filed Sep. 27, 2013 which are each herein incorporated by reference in their entirety.

The promotion component generator modules 212 may function to select or generate promotion components based on a promotion context as described above. For example, promotion component generator modules 212 may include a module to generate promotion "fine print", a module to select an image for association with the promotion, a module for selecting promotion price parameters, or the like. The self-service management module 210 may generate a "claim" to be processed by a particular promotion component generator module 212. This claim may include the promotion context, an identifier for the particular self-service operation (e.g., a unique identifier for the work-in-progress promotion), and any supplemental data requested or required by the particular promotion component generator.

Submission of a claim to a particular promotion component generator may initiate a set of tasks or processes for selecting or generating a promotion component. The claim spawns a set of tasks necessary to process the claim. The set of tasks may vary depending on the inputs. Some aspects of the promotion component generation process may be implemented as disjoint steps that are performed in parallel with the overall promotion generation process. These steps may not necessarily be able to be performed at the time the claim is processed, and these particular steps may instead be processed as various prerequisites are satisfied. For example, images that are uploaded by merchants may be manually checked for quality and appropriateness. This check may be performed by an administrator, editor, or other curator who may not be available at the time the image is uploaded. As such, example embodiments may allow for such a manual check to be performed in parallel with other aspects of the self-service workflow.

As another example, in some embodiments content generated by the self-service workflow may include a link to a merchant page. For newly registered merchants, such a page may not yet exist. Example embodiments may be operable to add the link to the content at a later time, in response to the merchant page being generated.

As yet another example of a modular workflow component that is capable of parallel execution, a workflow may include the ability to select images that are not yet licensed for attachment to a promotion. Such unlicensed images may be presented with an embedded watermark added by the image owner, so that the merchant can view how the image will appear. Once the user selects the watermarked image, the promotion and marketing service may obtain the right to distribute the image from the image owner and, in response to a determination that said rights have been obtained, remove the watermark from the image. This advantageously allows for users to have access to a wide variety of images without requiring the promotion and marketing service to obtain rights for images that are never used.

These particular steps may instead be processed as various prerequisites are satisfied. Different tasks may require different approaches. Some tasks depend upon other tasks. For example, if a given task relates to the association of an image with a promotion, the image may not be associated until upload and crop operations have completed. Some tasks may periodically poll to determine if one or more other tasks have been completed. For example, a promotion may require several narrative texts to be finalized. Some of these promotions may be input by the user, while others may be generated by other tasks (e.g., a fine print generator). A promotion generation task may thus poll each task from which it is waiting for text input, and generate the promotion in response to detecting that each of the text input dependencies are complete. Some other tasks may monitor for the occurrence of a particular event. For example, a promotion analytics task may not be able to obtain meaningful data until a promotion has been manually verified for publication. Such a verification process may take several days. Rather than frequently polling, an operation that may result in wasted processing power, the task may listen on an internal message bus to identify when the promotion has been published.

For example, an image selection component generator may generate tasks to (a) gather merchant details if they were not specified as inputs; (b) download an image binary from the digital asset catalog; (c) perform cropping and format conversion; (d) upload the resultant image to the content delivery network; (e) record audit information consumed by the legacy process; (f) wait for the legacy process to manually vet the promotion; (g) associate the image to the promotion; and (h) launch the promotion if all pending tasks have been completed. Embodiments advantageously allow for simultaneous parallel tasks in this process. For example, step (f) may require manual verification of the promotion, and this process may take several days to complete. Such a process may be difficult, if not impossible to automate, and other steps of the process may be delayed while waiting for the verification to complete.

Embodiments may therefore allow for asynchronous, parallel execution of steps such that the manual verification step does not delay other steps. For example, a graphical user interface (GUI) requesting the image selection may receive confirmation that the tasks (a)-(h) were enqueued, but will not necessarily be notified when they complete. The merchant/editorial staff member who requested the image will therefore not have to wait days for the tasks of the request to begin to execute.

In some synchronous implementations, an editorial step may require several pieces of text to be attached to a vetted promotion. Once each of the pieces is attached, a user may press a button to launch the promotion.

Embodiments may allow any number of these text attachments to be automated. In a scenario where image selection is automated, step (g) will associate the image to a deal. When step (h) executes, it may check whether there are any other tasks enqueued in the workflow for the promotion and wait for them to complete. Once the other tasks are complete, step (h) may inspect the deal to see whether each of the dozen pieces is populated. If not, step (h) may wait for an editor to populate them. Once all the fields are populated, step (h) may launch the deal.

If all of the dozen pieces are completed through the workflow, the promotion may be published without any involvement from the editor. If only some of the individual actions were completed, those pieces may be populated on behalf of the editor, but the deal will not be automatically published. The editor will still have to populate the non-automated pieces.

The following is an example of an abbreviated sequence of events that may represent the workflow described above. Numbered elements represent actions performed by other systems, while letters match the modular workflow tasks as described above:

TABLE 1

1) Editorial purchases a stock image and registers it with Editorial Content Service
2) Merchant generates a sales lead (opportunity) for a new promotion
3) Merchant selects a stock image that should appear on the deal
4) Upon selection of the stock image, the self-service manager "claims" the image by providing the workflow the image identifier, cropping instruction and sales lead identifier
b) Image is downloaded from a digital asset catalog using the identifier
c) Image is cropped according to requested dimensions, converted to appropriate image encoding
d) Cropped image is uploaded to the content delivery network; image URL is recorded
5) Merchant is registered into a merchant registry and given a merchant identifier
6) The sales lead is updated to include the merchant identifier
a) Workflow polls the sales lead and discovers the merchant identity
e) Audit records are updated to specify the merchant used the image
7) Sales lead is vetted and approved by sales
8) Promotion is created in a promotion registry for the sales lead
f) Promotion registry is polled and the identifier of the deal is discovered
g) Image URL is associated to the deal in Deal Registry
h) Workflow is scanned for other tasks associated to the same sales lead; Promotion registry is scanned to determine whether all fields are populated; deal is launched is everything is ready
9) Promotion is published to consumers via promotion and marketing service It should be appreciated that the particular sequence can differ depending on the circumstances. For example, if the merchant is already registered with the promotion and marketing service, tasks (a) and (e) may complete before task (b).

Some promotion component generator modules 212 may require additional information not provided in a "default" promotion context. Such additional information may be defined in a data structure providing information about a particular promotion component generator. This additional information may be referred to as "Supplemental data" in the context of the present application. Upon selection of a particular promotion component generator, the self-service management module 210 may request the supplemental data. For example, a promotion component generator module 212 that allows a user to provide an image for use with a promotion may allow the user to crop and/or edit the provided photo. Upon selecting the promotion component generator module 212 for providing a personal image, the self-service management module 210 may examine a database storing information about the promotion component generator modules available to identify additional inputs for the image selection module. These inputs may include, for example, an image and coordinates for cropping the image. In response to detecting that the promotion component generator requires these inputs, the self-service management module may prompt the user to provide a photo and photo cropping coordinates. Alternatively, inputs for a particular promotion component generator may be modified based on user selections. For example, if a user selects a stock image for a promotion, then the image may not require cropping, and thus inputs relating to cropping coordinates may not be requested. In some embodiments, certain processing may be performed in advance of the self-service workflow. For example, some images may be cropped before being uploaded for use by the self-service system. In some embodiments, inputs may be narrowed down to appropriate values beforehand, to make selection easier. For example, the duration of a massage may be limited to 45, 60 or 90 minutes, rather than requesting an arbitrary integer. The self-service manager may capture the unknown settings while interacting with the user making the selections. To create a massage deal, for example, one of the three durations may be required to be selected. To use an uncropped image, dimensions may be required to be specified in order to achieve the correct aspect ratio.

The content recommended by, for example, an editorial content service may specify the needed inputs for use in creation of a promotion. The self-service manager may be responsible for capturing these inputs and passing them to the workflow when claiming the asset. The content may be aware of the data that will be needed to perform its automation. That data may be captured upfront, when the merchant or sales representative is setting up the deal. The data may be stored in the workflow until it is eventually needed. Once the user makes the selections, the user does not have to be reengaged for further details.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Modular Self-Service Dataflow

Figure 3:
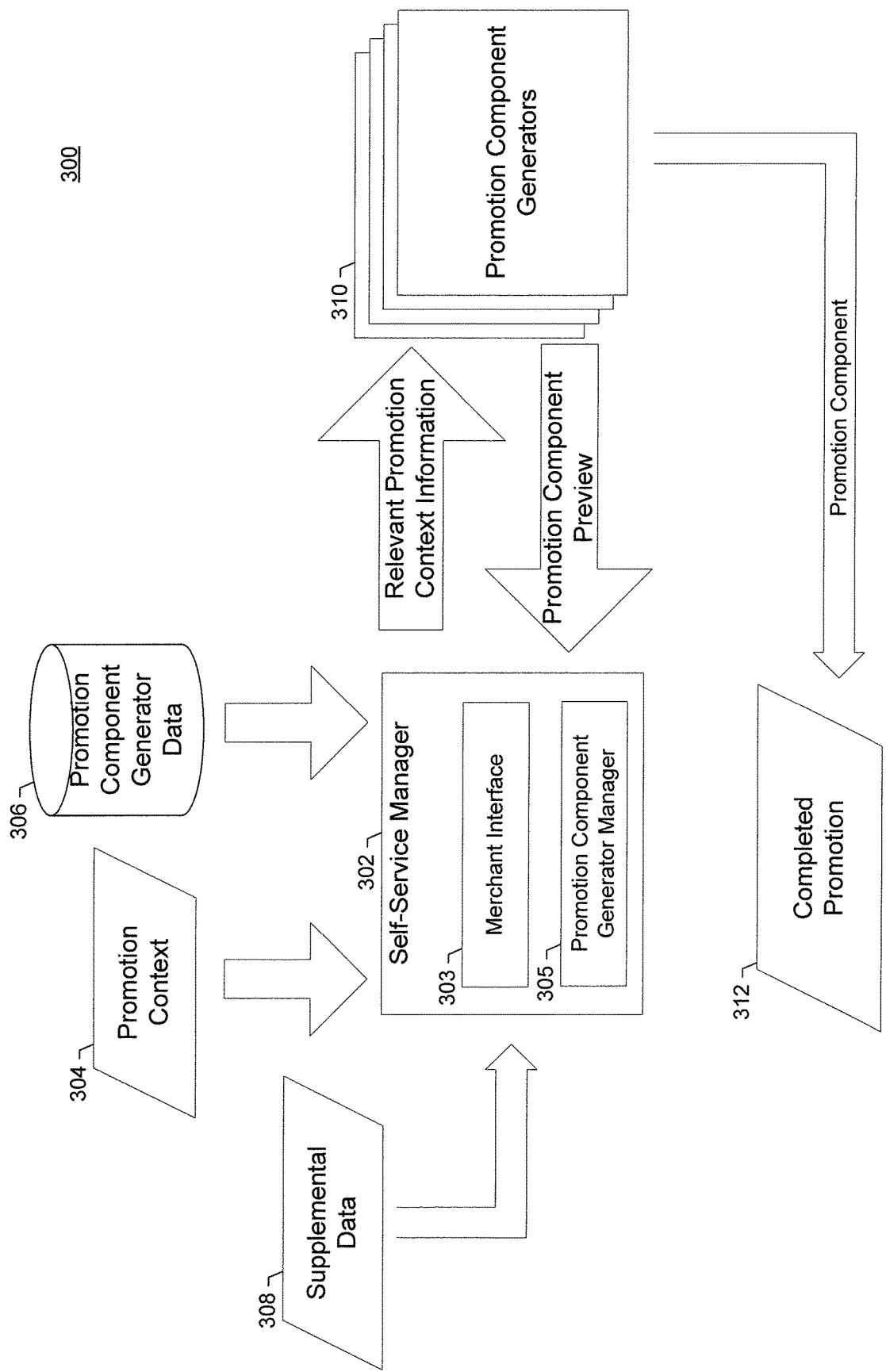
FIG. 3 depicts an illustration of a dataflow through a modular self-service interface in accordance with some embodiments described herein.

FIG. 3 depicts an example dataflow 300 illustrating a process for generating promotion components using a modular workflow in accordance with some embodiments of the present invention. The dataflow 300 may, for example, be implemented by an apparatus, such as described above with respect to the apparatus 200, or as part of a promotion and marketing service 102 and/or by a promotional server 104 as described above with respect to FIG. 1. The dataflow 300 illustrates how a promotion context 304 and promotion component generator data 306 may be provided to a self-service manager 302 to facilitate generation of a promotion through the use of one or more promotion component generators 310.

As described above, the promotion context 302 may include various details about the merchant, such as the merchant's business type, location, promotion dates, service type and type of promotion. Although many elements of the promotion context may be optional, completeness aids in the speed and accuracy of the automation. For example, a merchant may provide elements of the promotion context during a registration operation with the promotion and marketing service, or at the time of initiating a self-service process for generating a new promotion. The promotion component generator data 306 may include data describing the required and optional inputs for each promotion component generator available to the self-service manager, and the type of output provided by each promotion component generator. This information may include a schema that defines the inputs and outputs of each promotion component generator. Some embodiments may allow for definition of schema for elements using a markup language, such as, for example Extensible Markup Language (XML).

For example, an example schema of an image might be implemented as follows:

TABLE 2 left: non-negative integer
top: non-negative integer
width: positive integer
height: positive integer
image: URL
width * 3 = height * 5
width > 480

The schema for a particular promotion component generator may also include one or more supplemental inputs for use with the promotion component generator. The supplemental inputs may include data other than data that is included in the promotion context which is optional or required by the particular promotion component generator. For example, an image selection promotion component generator may include an optional supplemental input of a uniform resource locator (URL) associated with an image and coordinate inputs for cropping the image associated with the URL. If the URL is not provided, then the image promotion component generator may provide the user with stock images. If a URL is provided but coordinate inputs are not, the user may be prompted to crop the image at the time of input. If a URL and crop coordinates are both provided, then the image may be selected and cropped as indicated. If the promotion component generator schema specifies required inputs that are not provided by the promotion context, the merchant may be prompted to provide those inputs, or the promotion component generator may be marked as unavailable (e.g., "grayed out" in a self-service interface with a note that a particular required input is missing). In some embodiments, the self-service manager 302 may function to receive additional data from the merchant as input to provide the supplemental data required by particular promotion component generators. In some embodiments, particular promotion component generators may be selected for presentation to the merchant based on whether the inputs required by each promotion component generator are available.

When new promotion component generators 310 are made available for use with the self-service system, new entries may be made for the newly added promotion component generators within the promotion component generator data 306. In this regard, every promotion component generator 310 may have a defined schema stored within the promotion component generator data 306. By defining a schema for each promotion component generator 310, the self-service manager 302 may enable asynchronous processing of promotion component generation requests without direct integration with the particular promotion component generators. As such, changes may be made to the individual promotion component generators without impacting the processing or design of the self-service manager 302.

As described above, the self-service manager 302 may allow the merchant to select particular promotion component generators 310, or promotion component generators 310 may be automatically selected for the merchant. The self-service manager 302 may provide each promotion component generator 310 with the input data requested by the promotion component generator 310 and defined within the promotion component generator data 306 associated with the particular promotion component generator 310. In response to providing the required input data, the promotion component generator 310 may perform various processing steps to provide as output a promotion component to the self-service manager 302. The output may be provided in a particular format defined within the schema of the particular promotion component generator stored within the promotion component generator data 306. The output may be provided in a markup language, such as extensible hypertext markup language (XHTML), and may include various data, including but not limited to text, images, video, or the like.

The self-service manager 302 may include a merchant interface 303 to allow the merchant to provide information (e.g., selections for particular inputs for a promotion, merchant registration information, etc.), receive recommendations, and preview promotion components. For example, the merchant interface 303 may include a graphical user interface (GUI) for interaction with the merchant.

The self-service manager 302 may also include a promotion component generator manager 305 for analyzing the merchant information, selecting promotion component generators 310, and providing back-end processing for the merchant interface 303. The promotion component generator manager 305 may serve to identify components of the promotion the merchant may wish to add or receive recommendations from. Based on the inputs provided by the merchant, the promotion component generator manager 305 may generate a form with the inputs required by the promotion component generators 310 selected based on the merchant's input. This form may be provided to the merchant via the merchant interface 303. The information the merchant provides via this form may be passed to the appropriate promotion component generators as the promotion context 304.

In some embodiments, the self-service manager 302 and/or the promotion component generator manager 305 may generate a dependency graph of promotion component generator tasks that must be performed in order to execute each of the operations defined for the promotion component generators 310. It should be appreciated that a given promotion component generator 310 may include one or more individual tasks that have dependencies upon other promotion component generator tasks. Each task may be provided with the promotion context 304 and the supplemental data 308 as inputs as required for the particular task. As tasks are completed, the self-service manager 302 may facilitate the routing of outputs of one promotion component generator task as inputs to another task according to the dependency graph. As part of this process, the self-service manager 302 may periodically check for promotion component generator tasks that have not recently executed and which are not blocked on the dependency graph. These tasks may be executed to continue the generation of the promotion.

In the event a particular component generator 310 requires supplemental data 308, the supplemental data 308 may be obtained by the self-service manager 302. As described above, the self-service manager 302 may identify particular inputs for available promotion component generators 310, and the merchant may be prompted for particular types of supplemental data by the self-service manager 302, such as by an interface or fillable form provided by the self-service manager 302. The supplemental data 308 may be collected by the self-service manager 302 and passed to the promotion component generator 310 along with the promotion context 304.

For example, a merchant may wish to generate a promotion with a title of "10 Brazilian Jujitsu Classes or One Month of Classes at Groupon Jujitsu (Up to 73% Off)".

The promotion component generator data 306 may include a template. The template may have placeholders for values, so it can be used for many promotions. The template may include information indicating the pieces of data the template will need to generate the final content. The template may also have metadata, so it can be located when recommending templates. As an example, such a template might have the following structure and contents:

TABLE 3

```
content = [quantity(1)] Brazilian Jujitsu Classes or [duration(2)] of
Classes
  at [merchant-name] (Up to [max(discount(1), discount(2))] Off)
  inputs = {
    option 1:
      quantity: positive integer
      discount-percent: decimal between 0 and 1
    option 2:
      duration: period of time
      discount-percent: decimal between 0 and 1
    merchant-name: String
  }
  metadata = {
    category: martial arts
    language = English
  }
```

The self-service manager 302 may pass the promotion context 304 to an external promotion content generator, such as an editorial content system 123 as described with respect to FIG. 1, which recommends the template described above. The self-service manager 302 may read the requirements of the selected template and render a form that requires the merchant specify a quantity for the fixed number of classes, a duration for the membership, and discount percentages for both. The inputs required for the recommended content may thus be declared in the particular recommended content.

The self-service manager 302 may gather the data that is needed from the merchant (or editor). In some circumstances, additional data may be needed to generate the content, but may not be known at the time when the merchant makes the selection. The content can, for example, contain a link to the merchant's profile page. That page may not exist when the merchant is selecting content for the deal. To create the link, the workflow may receive the identifier for the sales lead. The merchant's identifier may later be attached to the sales lead, making it accessible to the workflow. From the merchant identifier, the link to the page can be retrieved.

The modular self-service workflow employed by the self-service manager 302 may be implemented as a dependency graph. Some tasks may be waiting for external events to occur; some may be fetching data that was not initially available; some may be constructing the content; others may be publishing the content or performing post-publication tasks.

In some embodiments, since some promotion component generators 310 are waiting on other tasks before providing promotion components, the promotion component generators 310 may provide a preview or work-in-progress promotion component to the self-service manager 302. These promotion component generators 310 may generate the corresponding component of a completed promotion when their respective dependencies are satisfied, resulting in a completed promotion 312. In this manner, the completed promotion 312 may be created asynchronously, such that the merchant's interactions with the self-service manager 302 are not delayed by any one individual promotion component generator or any particular step of the promotion generation workflow.

In this manner, embodiments advantageously provide for a workflow that is piecemeal and modular such that it is neither an end-to-end solution nor holistic. The workflow may still rely on external events provided by promotion component generators that have not been automated. As such, the promotion component generators 310 may include several external services and manual processes that are connected by tasks that have been automated. To perform these automated tasks, the self-service manager 302 may capture all of data that will eventually be needed when these tasks are ready to run. This data may be captured upfront, so the merchant does not have to be reengaged.

The promotion component generators 310 may provide a preview of the promotion components to the self-service manager 302 such as the markup language data described above. However, this preview may not be the final content. If the content will contain a link to a page that does not yet exist, for example, the link may not be valid, or a placeholder page may be included in the preview with an indication that the actual page will be generated at a later time.

Example Communication Between Self-Service Manager and Promotion Content Generator(s)

Figure 4:
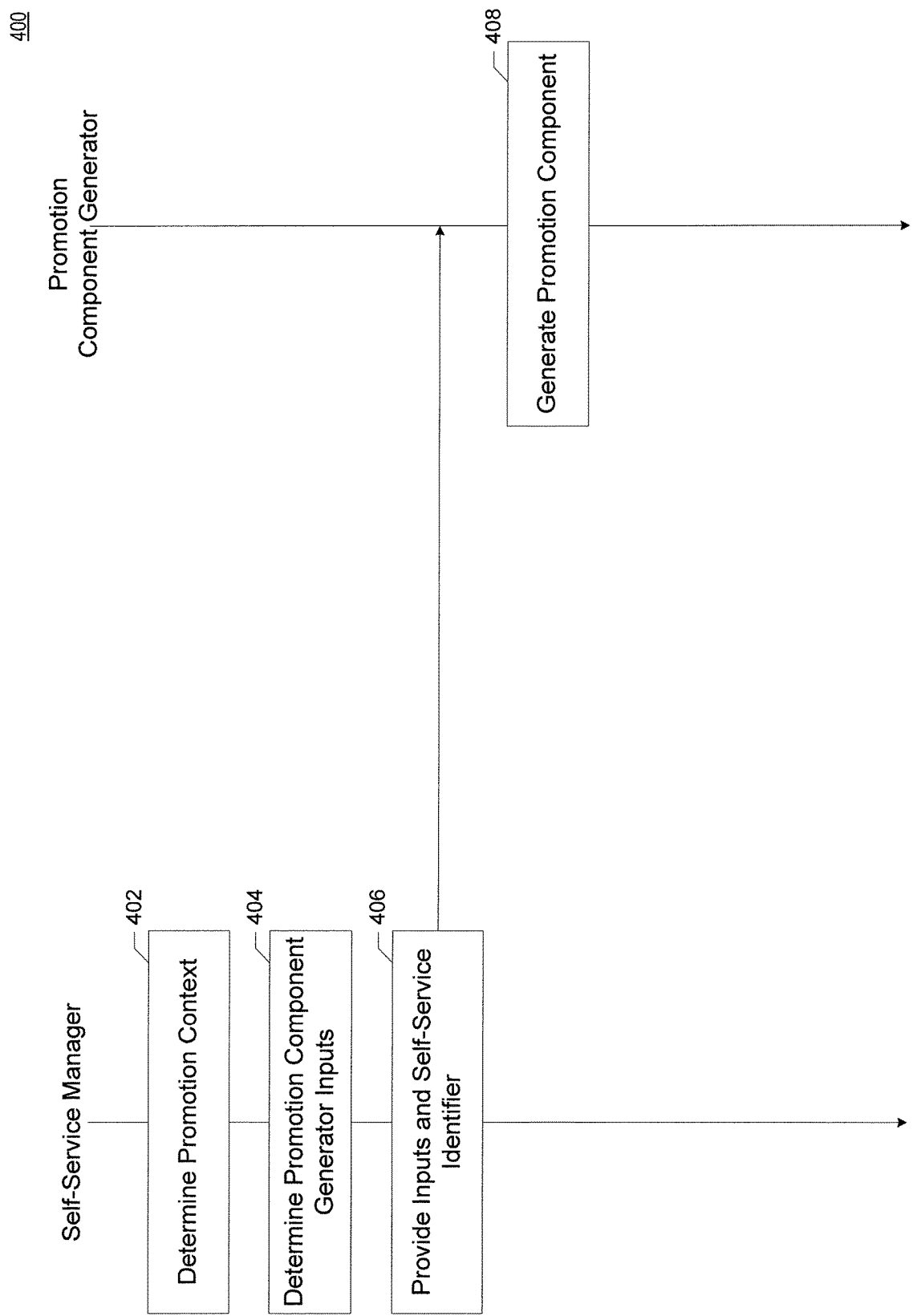
FIG. 4 depicts a signal diagram depicting communications between a self-service manager and a promotion component generator in accordance with some embodiments described herein.

FIG. 4 is a signaling diagram illustrating an example communication 400 between a self-service manager and a promotion content generator in accordance with some embodiments of the present invention. As described above, a self-service manager, such as the self-service manager 302, may communicate with one or more promotion content generators, such as the promotion content generators 310, to implement a self-service process in a modular manner. In this manner, the self-service manager may determine a promotion context, determine a set of inputs required by a promotion content generator, determine the set of inputs based on the promotion context, and provide the set of inputs to the promotion content generator. The promotion content generator may provide a promotion component for use in a newly generated promotion. The methods and processes described with respect to FIG. 4 may be performed by one or more apparatuses, such as the apparatus 200 described with respect to FIG. 2, or by elements of a promotional and marketing service as described with respect to FIG. 1.

At action 402, a promotion context is determined. As described above, the promotion context may include a set of merchant self-service indicators as provided by a merchant, such as via one or more interfaces provided by the self-service manager, provided by the merchant during registration with the promotion and marketing service, or the like. In some embodiments, the promotion context may further include one or more derived values, such as analytics generated by the promotion and marketing service based on information provided by the merchant. The promotion context may further include various parameters provided by the merchant prior to initiating the self-service operation, such as the type of promotion the merchant wishes to generate, a discount value the merchant wishes to offer, a return on investment the merchant wishes to achieve, or the like.

At action 404, inputs for one or more promotion component generators are determined. As described above, promotion component generators may be associated with a particular schema within a set of promotion component generator data, which may define required and optional inputs for each promotion component generator. The self-service manager may use this data to identify which promotion component generators are available based on the information provided in the promotion context and any additional supplemental information available to the self-service manager. In some embodiments, the self-service manager may provide an optional prompt to prompt the merchant to enter supplemental data, such as by indicating that additional promotion component generators will be available if the merchant provides certain additional data.

At action 406, the relevant inputs and a self-service identifier are provided to a promotion component generator. The relevant inputs may include any inputs required or associated with a particular promotion component generator as defined in the promotion component generator data. The self-service identifier may include a unique identifier associated with the particular self-service instance. The self-service identifier may provide a method for the promotion component generator to execute asynchronously and to provide a generated promotion component to a particular self-service instance whenever the promotion component generator has completed processing. The self-service manager may thus initiate additional or alternative processing while the promotion component generator is processing without needing to wait until the promotion component generator has provided the promotion component, since the promotion component generator can send the component to the particular self-service instance whenever the component is ready. The self-service manager 302 may further selectively execute particular promotion component generators as dependencies for each promotion component generator (or sub-tasks performed by the promotion component generator) are met.

At action 408, the promotion component generator receives the inputs and begins processing to generate a promotion component. Each promotion component generator may generate promotion components in its own manner. In this regard, the use of a schema to define a particular set of inputs and asynchronous execution allows for individual promotion component generators to be decoupled from the primary self-service manager process, such that additions and modifications may be made to individual promotion component generators without requiring substantial modification to the main self-service manager. Examples of processing performed by a particular promotion component generator may include operations to suggest fine print based on the promotional context, operations for suggesting a particular image or editing an image for association with the promotion, operations to register a merchant with the promotion and marketing service, operations to verify a merchant's identity, operations to analyze merchant point-of-sale data to assist with promotion pricing, operations to analyze merchant inventory levels to suggest particular promotions, operations to select a promotion title or other promotion text, operations to select a particular target demographic, group of users, or communication method, or any other operation to suggest, recommend, or select particular values that affect how a promotion is defined, priced, marketed, offered for sale, or the like. Generation of the promotion component may include providing the promotion component to an external system, such as a publication service provided by the promotion and marketing service. In this manner, the promotion component may be provided at any time the dependencies of the promotion component generator are met, without the need to provide the promotion component back to the self-service manager to include it in the final promotion. In this manner, promotion component generators may provide the promotion components to a common end-point or end-points without the need to complete the entire workflow in a linear manner.

Example Processing Operations Performed by Configured Apparatuses

Figure 5:
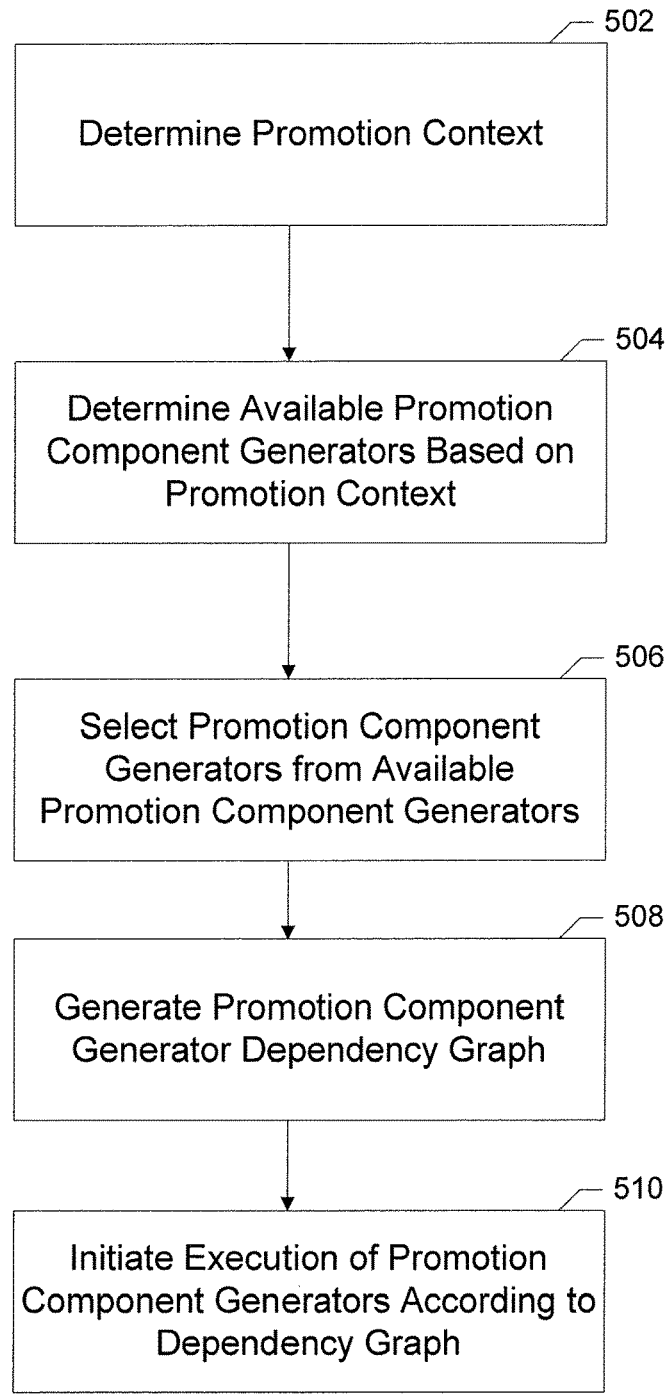
FIGS. 5-7 depict flow charts showing exemplary processes for providing a merchant self-service interface in accordance with some embodiments described herein.
Figure 6:
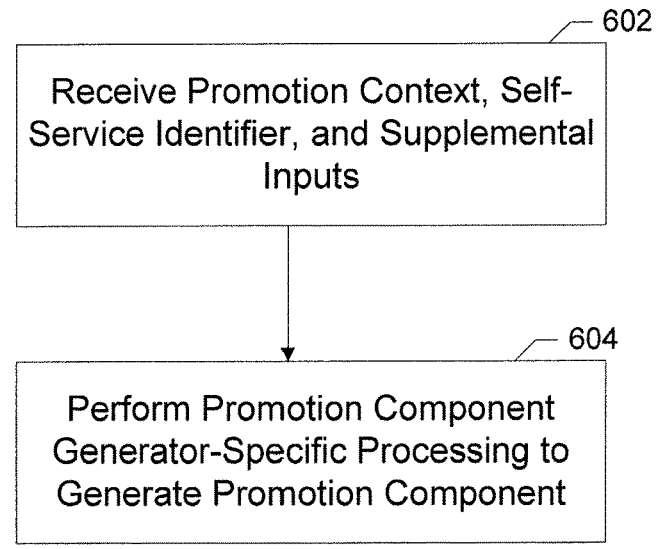
Figure 7:
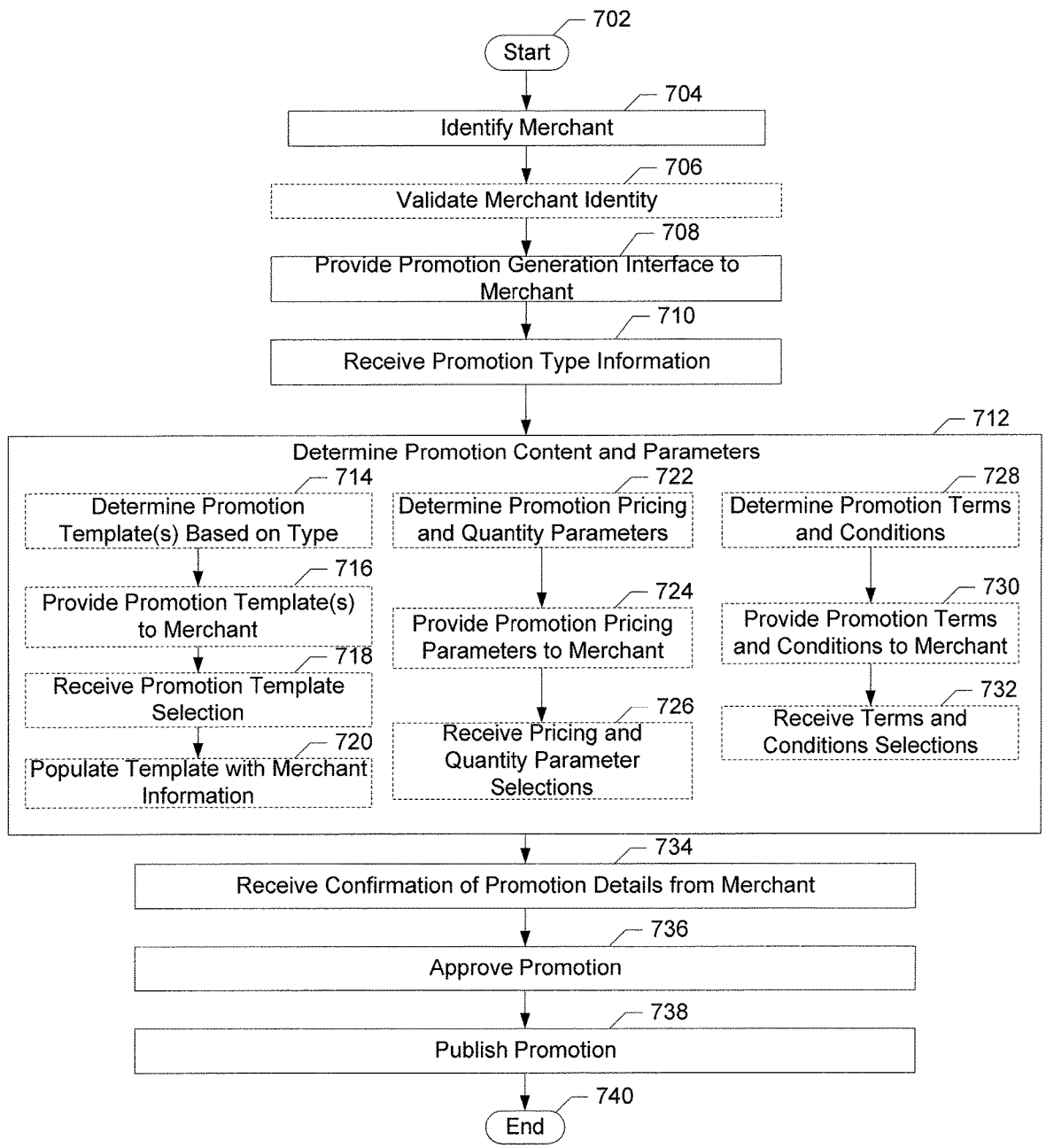

FIGS. 5-7 show example methods, namely processes 500, 600, and 700 that may be executed by one or more machines (some examples of which are discussed in connection with FIGS. 1 and 2), in accordance with some embodiments discussed herein. It should be appreciated that some or all of the actions described in FIG. 7 may be performed by a self-service manager interacting with one or more promotion component generators in accordance with embodiments of the present invention. These processes may be performed by computing devices as known in the art and described above with respect to FIGS. 1 and 2.

FIG. 5 depicts an example process 500 for selecting promotion component generators based on a promotion context in accordance with some embodiments of the present invention. As described above, different promotion component generators may require different types of inputs, and a promotion context may include a wide variety of different data values about the particular merchant, the particular promotion the merchant wishes to generate, or the like. The process 500 describes one exemplary method by which a self-service manager may utilize the data available within a promotion context to select particular promotion component generators for use in a promotion generation operation.

Once promotion component generators are selected, the self-service manager may determine a dependency graph for the selected promotion component generators and initiate processing of the promotion component generators as dependencies are met. The process 500 may be performed by an apparatus, such as the apparatus 200 described with respect to FIG. 2, or the promotion and marketing service described with respect to FIG. 1.

At action 502, a promotion context is determined. As described above, the promotion context may be determined based on information provided by the merchant, information inferred by the promotion and marketing service based on information provided by the merchant, general analytics data derived by the promotion and marketing service, and the like.

At action 504, the information available within the promotion context is compared against the required and optional inputs associated with promotion component generators available for a self-service operation. As described above, the inputs may be determined based on schemata associated with the promotion component generators as stored within a set of promotion component generator data. These schemata may also define supplemental data for one or more of the promotion component generators, such that the merchant may be prompted or the self-service manager may otherwise obtain the supplemental data in addition to the promotional context data.

At action 506, one or more promotion component generators are selected for use in the self-service process based on the availability of the information for those promotion component generators. For example, each promotion component generator for which the promotion context includes the respective required data for the promotion component generator may be executed for use in the self-service operation. Alternatively, promotion component generators for which required input data is available may be indicated to the user, such as by activating an interface control associated with the promotion component generator (e.g., allowing a user to click a checkbox or radio button associated with the promotion component generator), or the like.

At action 508, a dependency graph is generated for the promotion component generators. As described above, each promotion component generator may include one or more tasks that rely on particular inputs and provide particular outputs. The process 500 may identify the inputs required for the various promotion component generators and request the inputs from the user, but certain promotion component generators may require other tasks to be completed before they can process, or the merchant may not provide all inputs immediately when requested. The dependency graph identifies the required inputs for the tasks of the selected promotion component generators.

At action 510, the promotion component generators for which the dependencies are satisfied are executed. As additional dependencies are satisfied, the process 500 may continually update the executing promotion component generators to facilitate generation of the promotion. In this manner, the tasks of the promotion component generators that make up the self-service process may execute asynchronously in an intelligent manner to ensure that tasks are handled in an efficient manner while still providing the merchant with meaningful feedback during the self-service process.

FIG. 6 depicts an example process 600 for generating a promotion component by a promotion component generator in accordance with some embodiments of the present invention. As described above, promotion component generators may receive input from a self-service manager and execute asynchronously to generate promotion components for use in a self-service operation. In this manner, promotion component generators may function as separate processes that receive defined inputs and provide defined outputs to the self-service manager, such that if a promotion component generator is modified, it is not necessary to modify the self-service manager to maintain compatibility. The process 600 may be performed by an apparatus, such as the apparatus 200 described with respect to FIG. 2, or the promotion and marketing service described with respect to FIG. 1.

At action 602, the promotion component generator receives input as defined in the schema associated with the promotion component generator (which may include elements of the promotion context, supplemental data, or both), along with a self-service identifier identifying the particular self-service operation. As described above, the self-service identifier may enable the promotion component generator to execute autonomously, and to provide a recommended promotion component to the particular self-service operation whenever the promotion component generator completes processing. Also as described above, receiving of input may be controlled by a dependency graph maintained by a self-service manager, such that the promotion component generator begins processing in response to the self-service manager identifying that all dependencies for the promotion component generator are satisfied. Additionally or alternatively, the promotion component generator itself may monitor for satisfaction of its dependencies and begin processing in response to determining that all dependencies are met.

At action 604, the promotion component generator performs the generator-specific processing necessary to generate the particular component for which the promotion component generator is responsible. For example, a fine print generator may generate fine print for the promotion, while a title generator may generate a title, and a price parameter generator may generate a set of price parameters. The output of the promotion component generator may be provided as a preview to a self-service manager or, alternatively, directly to a particular system (e.g., a publication system) for inclusion in a promotion without further interaction with the self-service manager.

FIG. 7 depicts an example process 700 for providing merchant self-service. The process 700, when completed, allows a merchant to provide information to a promotion and marketing service to enable that promotion and marketing service to offer one or more promotions to consumers that are redeemable with the merchant for goods and services. The process 700 may provide merchants with the ability to generate one or more such promotions without the need for direct intervention with employees of the promotion and marketing service.

At action 702, the process 700 begins, such as upon receiving an indication from a merchant to begin the self-service process. The process 700 proceeds to action 704, wherein the merchant is identified. The merchant may be identified based on user account credentials, such as by providing a login name and password associated with a particular merchant. In some embodiments, such as where the merchant is newly registering with the promotion and marketing service and has not yet established account credentials, identification of the merchant may be performed by the merchant providing contact information, such as the merchant's name, address, or phone number. Identification of the merchant may provide the promotion and marketing service with merchant self-service indicators that are employed to inform the self-service process. For example, the merchant type, the merchant location, historical promotion sales for the merchant, and other merchant self-service indicators may be used to assist with selection of promotion templates, promotion content, promotion pricing, and the like. In some embodiments, the promotion and marketing service may independently determine some or all of the merchant identification information, such as by accessing a browser cookie associated with the user's browsing session or by identifying the internet protocol address used by the user.

At action 706, the process 700 may optionally validate the identity of the merchant. Validation of the merchant identity may occur by contacting the merchant via a known contact method for the merchant (e.g., a phone number or e-mail address stored in an external merchant information database that is confirmed to be correct for the merchant with whom the user purports to be associated). Validation of the identity of the merchant in this manner may ensure that the merchant interacting with the self-service system is an authorized representative of the merchant for which the promotion is generated.

At action 708, an interface may be provided to the merchant to allow the merchant to generate a new promotion. For example, the merchant may select from a menu option indicating the merchant wishes to generate a new promotion, and the promotion generation interface may be provided to the merchant in response to selection of the menu option. The promotion generation interface may allow the merchant to input a promotion type (e.g., a type of good or service which the merchant wishes to promote). In some embodiments, the merchant may be provided with a list of possible promotion types based on merchant self-service indicators, such as the type of merchant (e.g., food promotions for a restaurant, massage promotions for a spa, etc.).

At action 710, promotion type information is received. The promotion type information may be based on a menu selection performed by the merchant, or a default promotion type may be selected for the merchant based on certain merchant self-service indicators. In some embodiments, the merchant may be provided with the ability to select an alternate promotion type instead of the default promotion type.

At action 712, content and parameters may be determined for the promotion to be generated by the self-service interface. As described above, various modules and systems may be employed to assist the merchant with selection of the various elements of the promotion, including but not limited to narrative content (e.g., images and text to be displayed to a consumer), promotion parameters (e.g., how the promotion will be redeemed, the redemption value, the type of goods and services offered in exchange for the promotion, and the like), promotion pricing terms (e.g., the fee charged to the merchant by the promotion and marketing service), and/or the terms and conditions of the promotion (e.g., the "fine print"). Determination of the content and parameters for the promotion may also entail providing the merchant with analytic data for past promotions and respected return-on-investment calculations to assist the merchant with generating the promotion. These actions may be performed by promotion component generators as described above, such that the actions performed with respect to action 712 are performed in an asynchronous, modular manner.

Selection of the content and parameters for the promotion may include the use of a promotion template, as described above. For example, at action 714 the process 700 may identify several promotion templates for promotion content that have previously been successful for promotions of the same type, and allow the merchant to choose from among the identified promotion templates at action 716. Additionally or alternatively, the merchant may select a blank template to input their own content, or the merchant may be provided with the ability to edit one or more proposed templates. At action 718, the merchant may select a template and at action 720, the template may be populated with values for insertion into the promotion by the merchant. In some embodiments, the template may be automatically populated with information related to the merchant, such as the merchant name, contact information, or product name. In some embodiments, the merchant may be presented with multiple content offerings for selection. For example, the merchant may be provided with a number of images determined based on the promotion type, and the merchant may select one of the images to be displayed alongside of the promotion.

Determination of the content and parameters for the new promotion may also include determining pricing and quantity parameters for the promotion, such as the fee to be charged to the merchant by the promotion and marketing service. At action 722, the process 700 may determine promotion parameters (e.g., quantity or price terms) or range of parameters for the promotion that will be acceptable to both the merchant and the promotion and marketing service. The merchant may be presented with the determined parameters at action 724. For example, the merchant may be presented with a selection of pricing parameters that ensure a minimum return-on-investment for the merchant while also maximizing revenue for the promotion and marketing service. In some embodiments, the merchant may be presented with one or more sliders that are dependent upon one another, such that as one price parameter is adjusted by the merchant, other parameters move in concert. For example, the promotion and marketing service may charge a smaller fee per promotion sold if the merchant increases the volume of promotions to be offered. As another example, as the merchant increases the price for each promotion, the process 700 may estimate that fewer promotions will be sold, lowering the expected revenue for the promotion and marketing service. As such, the fee charged per promotion may increase to ensure positive revenue for the promotion and marketing service in response to an increase in the purchase price of the promotion by the merchant. At action 726, the merchant's price and quantity parameter selections may be received.

Determination of the content and parameters for the new promotion may also include selection of certain terms and conditions to be associated with the new promotion. For example, at action 728, the process 700 may determine a set or plurality of sets of terms and conditions for consideration by the merchant. These determined terms and conditions may be identified based on various merchant self-service indicators, such as the merchant's past promotions, the type of promotion, the location of the merchant, or the like. At action 730, these terms and conditions may be provided to the merchant for selection and/or editing. At action 732, the merchant's selections for the terms and conditions may be received and incorporated into the new promotion.

It should be readily appreciated that the above examples merely reflect examples of the processes that may be employed to determine the promotion content and parameters described at action 712. Determining of the promotion content and parameters may also be performed using various additional analytic and historical data. In some embodiments, the methods described herein may be utilized in concert with one another (e.g., analyzing the impact of fine print selections on the optimal price parameters for the promotion). Determination of the promotion content and parameters may also include presenting the merchant with analytic data for the merchant's past promotions and/or similar promotions offered by other merchants, thus assisting the merchant with making an informed decision when generating the promotion.

At action 734, the merchant may be presented with the opportunity to confirm the details of the promotion. As described above, the merchant may be presented with a set of default content and parameters for the promotion, which may be edited during the process described with respect to action 712. The merchant may review the details of the promotion and submit the promotion for approval by the promotion and marketing service.

At action 736, the newly created promotion may be approved by the promotion and marketing service. Approval of the promotion may include manual or automatic verification that the content of the promotion is suitable for use with the promotion and marketing service. For example, a representative of the promotion and marketing service may perform quality control of newly generated promotions to ensure that the promotions are valid (e.g., associated with a valid merchant) and that the promotions meet quality standards (e.g., editing for spelling errors and typographical errors in promotion text) and market standards (e.g., the promotion offers at least a minimum discount to make the promotion worth the time of the consumer to purchase). In some embodiments, approval may be performed in an automated manner. For example, the process 700 may determine that the newly generated promotion falls within a certain range of values that have been approved in the past for the same or similar promotions.

At action 738, upon approval of the promotion, the promotion may be published via the promotion and marketing service. Publication of the promotion may include providing the promotion for purchase to consumers, such as via an e-commerce interface (e.g., a web page or application) offered by the promotion and marketing service. The process ends at action 740.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as the processor 202, as discussed above with reference to FIG. 2, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., the memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for partial or piece-meal generation of a promotion by providing (i) a first interface that receives input and provides information interactable by a merchant, (ii) a first application that selects promotion component generators, each promotion component generator embodied at least in part by software that, upon execution, is configured for determining a promotion component of the promotion; and a plurality of promotion component generators, each executing independently of the first application, the method comprising:
   receiving one or more merchant self-service indicators, via input at the first interface being displayed on a merchant device;
   storing, in a database, the one or more merchant self-service indicators; and
   generating the promotion, the promotion comprised of a plurality of promotion components, wherein the promotion is presented media indicative of a promotional value that upon purchase or acceptance results in an issuance of an instrument configured for use toward at least a portion of a purchase of particular goods, services, or experiences defined by the promotion,
   wherein the generation of the promotion comprises:
   generating each of the plurality of promotion components, the plurality of promotion components comprising at least a first promotion component and a second promotion component,
   wherein the generating the plurality of promotion components, including the first promotion component and the second promotion component, comprises:
      individually accessing, by the first application and based on the merchant self-service indicators, each of the plurality of promotion component generators that each were selected by the first application, wherein the individual accessing of each of the plurality of promotion component generators enables asynchronous processing of promotion component generation requests, from the first application, without direct integration with particular promotion component generators, that enables simultaneous and parallel changes to any individual promotion component without impacting the processing or design of the first application,
      wherein the individual accessing of the plurality of promotion component generators occurs in parallel, enabling parallel generation of each of the plurality of promotion components via independent performance of the plurality of promotion component generators without impacting the processing of any other individual promotion component;
   comparing, by the first application, the one or more merchant self-service indicators that were previously stored upon receiving their input by a user at the first interface against required and optional inputs associated with each of the plurality of promotion component generators, the required and optional inputs determined based on schemata associated with each particular promotion component generator and stored within a set of promotion component generator data;
   selecting, by the first application, one or more promotion component generators based on an availability of the required and optional inputs;
   determining, by the first application, an unavailability of any of the plurality of promotion component generators having required inputs that are not available as determined in the comparison of the one or more merchant self-service indicators that were input by the user at the first interface against the required and optional inputs associated with each of the plurality of promotion component generators;
   determining, by the first application, based on the availability of the required and optional inputs, a first set of one or more inputs for a first promotion component generator of the plurality of promotion component generators based on a schema associated with the first promotion component generator for use in a promotion generation operation to generate the promotion;
   determining, by the first application, based on the availability of the required and optional inputs, a second set of one or more inputs for generation of the second promotion component, different than the first promotion component, via selection of a different promotion component generator of the plurality of promotion component generators based on a second schema associated with the different promotion component generator for use in the promotion generation operation to generate the promotion;
   providing, automatically, from the first application, via a communications module, controlled by a processor executing the first application, the first set of one or more inputs to the first promotion component generator;
   providing, automatically, from the first application, via the communications module, controlled by the processor executing the first application, the second set of one or more inputs to the different promotion component generator;
   receiving, by the first application, at least one first promotion component from the first promotion component generator in a particular format defined within the schema associated with the first promotion component generator, the at least one first promotion component received in a markup language;

receiving a preview promotion component associated with the promotion from at least one promotion component generator of the plurality of promotion component generators, wherein the at least one promotion component generator corresponds to at least one required input not yet available;

causing rendering of an additional interface comprising a preview of promotion content, at least a portion of the promotion content rendered based at least in part on the preview promotion component, wherein the preview promotion component is automatically and dynamically updated as a new promotion component is generated in response to availability of the at least one required input from another promotion component generator;

receiving, by the first application, the second promotion component of the promotion from the different promotion component generator in a particular format defined within the second schema associated within the different promotion component generator, the second promotion component received in the markup language; and generating the promotion, the promotion comprised of at least the first promotion component and the second promotion component.

2. The method of claim 1, further comprising:
providing a subset of the first set of one or more inputs to the first promotion component generator, wherein a remaining input, despite being available, is subject to one or more dependencies, resulting in a delayed availability; and
providing, automatically, from the first application, upon completion of all dependencies, the remaining input of the first set of one or more inputs.

3. The method of claim 1, further comprising determining whether all of the inputs for the first promotion component generator are available to be provided to the first promotion component generator.

4. The method of claim 3, further comprising in response to determining that all of the inputs for the first promotion component generator are not present, providing an interface for entry of the inputs that are not present.

5. The method of claim 3, further comprising providing the inputs to the first promotion component generator only in response to determining that all of the inputs for the first promotion component generator are present.

6. The method of claim 1, further comprising:
upon selection of the first promotion component generator, initiating a set of tasks or processes necessary for generating the first promotion component, wherein the set of tasks is dependent on the inputs, wherein one or more portions of the set of tasks for generating the first promotion component are implemented as disjoint steps that are performed in parallel with the overall promotion generation process, wherein steps of the one or more portions of the set of tasks are not able to be performed at the time the selection is made, and instead are processed as one or more prerequisites are satisfied.

7. The method of claim 1, further comprising:
generating a dependency graph for the plurality of promotion component generators, the plurality of promotion component generators comprising the first promotion component generator; and
executing each of the promotion component generators in response to determining that the dependencies for each respective promotion component generator are satisfied.

8. The method of claim 1, wherein at least one component generator of the plurality of promotion component generators relies on at least one external service.

9. An apparatus for partial or piece-meal generation of a promotion by providing (i) a first interface that receives input and provides information interactable by a merchant, (ii) a first application that selects promotion component generators, each promotion component generator embodied at least in part by software that, upon execution, is configured for determining a promotion component of the promotion; and a plurality of promotion component generators, each executing independently of the first application, the apparatus comprising at least one processor coupled to a memory, the memory comprising computer executable instructions that, when executed by the at least one processor, configure the apparatus to:

receive one or more merchant self-service indicators, input at the first interface being displayed on a merchant device;

store, in a database, the one or more merchant self-service indicators; and generate the promotion, the promotion comprised of a plurality of promotion components, wherein the promotion is presented media indicative of a promotional value that upon purchase or acceptance results in an issuance of an instrument configured for use toward at least a portion of a purchase of particular goods, services, or experiences defined by the promotion, wherein the generation of the promotion comprises generating each of the plurality of promotion components, the plurality of promotion components comprising at least a first promotion component and a second promotion component, wherein the generating the plurality of promotion components, including the first promotion component and the second promotion component, comprises computer executable instructions that, when executed by the at least one processor, configure the apparatus to:

access, by the first application, based on merchant the self-service indicators, individually, each of the plurality of promotion component generators, wherein the individual accessing of each of the plurality of promotion component generators enables asynchronous processing of promotion component generation requests, from the first application, without direct integration with particular promotion component generators, thus allowing changes to any individual promotion component without impacting the processing or design of the first application, wherein individual accessing of the plurality of promotion component generators occurs in parallel, enabling parallel generation of each of the plurality of promotion components via independent performance of the plurality of promotion component generators;

compare, by the first application, the one or more merchant self-service indicators that were previously stored upon receiving their input by a user at the first interface against required and optional inputs associated with each of the plurality of promotion component generators, the required and optional inputs determined based on schemata associated with each particular promotion component generator and stored within a set of promotion component generator data;

select, by the first application, one or more promotion component generators based on an availability of the required and optional inputs;

determine, by the first application an unavailability of any of the plurality of promotion component generators having required inputs that are not available as determined in the comparison of the one or more merchant self-service indicators that were input by the user at the first interface against the required and optional inputs associated with each of the plurality of promotion component generators;

determine, by the first application, based on the availability of the required and optional inputs, a first set of inputs for the inputs for a first promotion component generator of the plurality of promotion component generators based on a schema associated with the first promotion component generator for use in a promotion generation operation to generate the promotion;

determine, by the first application, based on the availability of the required and optional inputs, a second set of one or more inputs for generation of the second promotion component, different than the first promotion component, via selection of a different promotion component generator of the plurality of promotion component generators based on a second schema associated with the different promotion component generator for use in the promotion generation operation to generate the promotion;

provide, automatically, from the first application, via a communications module, controlled by the at least one processor executing the first application, the first set of inputs to the first promotion component generator;

provide, automatically, from the first application, via the communications module, controlled by the at least one processor executing the first application, the second set of one or more inputs to the different promotion component generator;

receive, by the first application, at least one first component from the first promotion component generator in a particular format defined within the schema associated with the first promotion component generator, the at least one first component received in a markup language;

receiving a preview promotion component associated with the promotion from at least one promotion component generator of the plurality of promotion component generators, wherein the at least one promotion component generator corresponds to at least one required input not yet available;

causing rendering of an additional interface comprising a preview of promotion content, at least a portion of the promotion content rendered based at least in part on the preview promotion component, wherein the preview promotion component is automatically and dynamically updated as a new promotion component is generated in response to availability of the at least one required input from another promotion component generator;

receive, by the first application, the second promotion component of the promotion from the different promotion component generator in a particular format defined within the second schema associated within the different promotion component generator, the second promotion component received in the markup language; and generate the promotion, the promotion comprised of at least the first promotion component and the second promotion component.

10. The apparatus of claim 9, further configured to:
provide a subset of the first set of inputs to the first promotion component generator, wherein a remaining input, despite being available, is subject to one or more dependencies, resulting in a delayed availability; and
provide, automatically, from the first application, upon completion of all dependencies, the remaining input of the first set of inputs.

11. The apparatus of claim 9, further configured to determine whether all of the inputs for the first promotion component generator are available to be provided to the first promotion component generator.

12. The apparatus of claim 11, further configured to, in response to determining that all of the inputs for the first promotion component generator are not present, provide an interface for entry of the inputs that are not present.

13. The apparatus of claim 11, further configured to provide the inputs to the first promotion component generator only in response to determining that all of the inputs for the first promotion component generator are present.

14. The apparatus of claim 9, further configured to:
upon selection of the first promotion component generator, initiate a set of tasks or processes necessary for generating the first promotion component, wherein the set of tasks is dependent on the inputs, wherein one or more portions of the set of tasks for generating the first promotion component are implemented as disjoint steps that are performed in parallel with the overall promotion generation process, wherein steps of the one or more portions of the set of tasks are not able to be performed at the time the selection is made, and instead are processed as one or more prerequisites are satisfied.

15. The apparatus of claim 9, further configured to:
generate a dependency graph for the plurality of promotion component generators, the plurality of promotion component generators comprising the first promotion component generator; and
execute each of the promotion component generators in response to determining that the dependencies for each respective promotion component generator are satisfied.

16. A non-transitory computer readable storage medium for partial or piece-meal generation of a promotion by providing (i) a first interface that receives input and provides information interactable by a merchant, (ii) a first application that selects promotion component generators, each promotion component generator embodied at least in part by software that, upon execution, is configured for determining a promotion component of the promotion; and a plurality of promotion component generators, each executing independently of the first application, the non-transitory computer readable storage medium comprising instructions that, when executed by a processor, configure the processor to:
receive one or more merchant self-service indicators, input at the first interface being displayed on a merchant device;
store, in a database, the one or more merchant self-service indicators; and
generate the promotion, the promotion comprised of a plurality of promotion components, wherein the promotion is presented media indicative of a promotional value that upon purchase or acceptance results in an issuance of an instrument configured for use toward at least a portion of a purchase of particular goods, services, or experiences defined by the promotion,
wherein the generation of the promotion comprises generating each of the plurality of promotion components, the plurality of promotion components comprising at least a first promotion component and a second promotion component, wherein the generating of the plurality of promotion components, including the first promotion component and the second promotion component, comprises instructions that, when executed by the processor, configure the processor to:

access, by the first application, based on the merchant self-service indicators, individually, each of the plurality of promotion component generators, wherein the individual accessing of each of the plurality of promotion component generators enables asynchronous processing of promotion component generation requests, from the first application, without direct integration with particular promotion component generators, thus allowing changes to any individual promotion component generators without impacting processing or design of the first application, wherein individual accessing of the plurality of promotion component generators occurs in parallel, enabling parallel generation of each of the plurality of promotion components via independent performance of the plurality of promotion component generators;

compare, by the first application, the one or more merchant self-service indicators that were previously stored upon receiving their input by a user at the first interface against required and optional inputs associated with each of the plurality of promotion component generators, the required and optional inputs determined based on schemata associated with each particular promotion component generator and stored within a set of promotion component generator data;

select, by the first application, one or more promotion component generators based on an availability of the required and optional inputs;

determine, by the first application, an unavailability of any of the plurality of promotion component generators having required inputs that are not available as determined in the comparison of the one or more merchant self-service indicators that were input by the user at the first interface against the required and optional inputs associated with each of the plurality of promotion component generators;

determine, by the first application, based on the availability of the required and optional inputs, a first set of inputs for the inputs for a first promotion component generator of the plurality of promotion component generators based on a schema associated with the first promotion component generator for use in a promotion generation operation to generate the promotion;

determine, by the first application, based on the availability of the required and optional inputs, a second set of one or more inputs for generation of the second promotion component, different than the first promotion component, via selection of a different promotion component generator of the plurality of promotion component generators based on a second schema associated with the different promotion component generator for use in the promotion generation operation to generate the promotion;

provide, automatically, from the first application, via a communications module, controlled by the processor executing the first application, the first set of inputs to the first promotion component generator;

provide, automatically, from the first application, via the communications module, controlled by the processor executing the first application, the second set of one or more inputs to the different promotion component generator;

receive, by the first application, at least one first component from the first promotion component generator in a particular format defined within the schema associated with the first promotion component generator, the at least one first component received in a markup language;

receiving a preview promotion component associated with the promotion from at least one promotion component generator of the plurality of promotion component generators, wherein the at least one promotion component generator corresponds to at least one required input not yet available;

causing rendering of an additional interface comprising a preview of promotion content, at least a portion of the promotion content rendered based at least in part on the preview promotion component, wherein the preview promotion component is automatically and dynamically updated as a new promotion component is generated in response to availability of the at least one required input from another promotion component generator;

receive, by the first application, the second promotion component of the promotion from the different promotion component generator in a particular format defined within the second schema associated within the different promotion component generator, the second promotion component received in the markup language; and generate the promotion, the promotion comprised of at least the first promotion component and the second promotion component.

17. The computer readable storage medium of claim 16, further configured to:

provide a subset of the first set of inputs to the first promotion component generator, wherein a remaining input, despite being available, is subject to one or more dependencies, resulting in a delayed available; and to provide, automatically, from the first application, upon completion of all dependencies, the remaining input of the first set of inputs.

18. The computer readable storage medium of claim 16, wherein the instructions further configure the processor to determine whether all of the inputs for the first promotion component generator are available to be provided to the first promotion component generator.

19. The computer readable storage medium of claim 18, wherein the instructions further configure the processor to, in response to determining that all of the inputs for the first promotion component generator are not present, provide an interface for entry of the inputs that are not present.

20. The computer readable storage medium of claim 18, wherein the instructions further configure the processor to provide the inputs to the first promotion component generator only in response to determining that all of the inputs for the first promotion component generator are present.

* * * * *